United States Patent
Yamanoi et al.

(10) Patent No.: US 11,707,727 B2
(45) Date of Patent: Jul. 25, 2023

(54) SOLIDIFIED POROUS CARBON MATERIAL AND METHOD OF MANUFACTURING THE SAME

(71) Applicant: Sony Corporation, Tokyo (JP)

(72) Inventors: Shun Yamanoi, Kanagawa (JP); Seiichiro Tabata, Kanagawa (JP); Hironori Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 16/070,924

(22) PCT Filed: Feb. 21, 2017

(86) PCT No.: PCT/JP2017/006363
§ 371 (c)(1),
(2) Date: Jul. 18, 2018

(87) PCT Pub. No.: WO2017/146044
PCT Pub. Date: Aug. 31, 2017

(65) Prior Publication Data
US 2019/0022624 A1    Jan. 24, 2019

(30) Foreign Application Priority Data

Feb. 23, 2016 (JP) .................................. 2016-031637
Feb. 17, 2017 (JP) .................................. 2017-027603

(51) Int. Cl.
*B01J 20/20* (2006.01)
*C01B 32/318* (2017.01)
(Continued)

(52) U.S. Cl.
CPC .............. *B01J 20/20* (2013.01); *B01J 20/28* (2013.01); *B01J 20/28011* (2013.01);
(Continued)

(58) Field of Classification Search
None
See application file for complete search history.

(56) References Cited

U.S. PATENT DOCUMENTS

| 5,204,310 A | 4/1993 | Tolles |
| 5,238,470 A | 8/1993 | Tolles et al. |
| 2016/0023959 A1* | 1/2016 | Bontchev .............. C05F 11/02 71/24 |

FOREIGN PATENT DOCUMENTS

| CN | 1220615 A | 6/1999 |
| CN | 1490079 A | 4/2004 |

(Continued)

OTHER PUBLICATIONS

Gulyas et al.; Effect of the Soil Treated with Biocharon the Rye-Grass in Laboratory Experiment; Ata Universitatis Sapientiae Agriculture and Environment, 6; 24-32 2014.*

(Continued)

*Primary Examiner* — Guinever S Gregorio
(74) *Attorney, Agent, or Firm* — K&L Gates LLP

(57) ABSTRACT

A solidified porous carbon material uses a plant-derived material as a raw material, a bulk density of the solidified porous carbon material is in the range of 0.2 to 0.4 grams/cm³, preferably, 0.3 to 0.4 grams/cm³. A value of a cumulative pore volume in the range of 0.05 to 5 μm in pore size based on a mercury press-in method is in the range of 0.4 to 1.2 cm³, preferably, 0.5 to 1.0 cm³ per 1 gram of the solidified porous carbon material.

11 Claims, 6 Drawing Sheets

(51) Int. Cl.
    *B01J 20/28* (2006.01)
    *C02F 1/28* (2023.01)
    *B01J 20/30* (2006.01)
    *C01B 32/336* (2017.01)

(52) U.S. Cl.
    CPC ... *B01J 20/28071* (2013.01); *B01J 20/28073* (2013.01); *B01J 20/28076* (2013.01); *B01J 20/28085* (2013.01); *B01J 20/30* (2013.01); *B01J 20/305* (2013.01); *B01J 20/3078* (2013.01); *C01B 32/318* (2017.08); *C01B 32/336* (2017.08); *C02F 1/28* (2013.01); *C01P 2006/11* (2013.01); *C01P 2006/14* (2013.01); *C01P 2006/16* (2013.01)

(56) References Cited

FOREIGN PATENT DOCUMENTS

| | | |
|---|---|---|
| CN | 1816300 A | 8/2006 |
| CN | 101541676 A | 9/2009 |
| CN | 101571306 A | 11/2009 |
| CN | 103204281 A | 7/2013 |
| CN | 103347604 A | 10/2013 |
| CN | 103641113 A | 3/2014 |
| CN | 204020350 U | 12/2014 |
| CN | 104312601 A | 1/2015 |
| CN | 104641435 A | 5/2015 |
| CN | 105060288 A | 11/2015 |
| EP | 2 664 375 | 11/2013 |
| JP | S51090995 A | 8/1976 |
| JP | H03-223105 A | 10/1991 |
| JP | H06-009208 A | 1/1994 |
| JP | 08-224468 | 9/1996 |
| JP | H08-224468 A | 9/1996 |
| JP | 2009-226401 | 10/2009 |
| JP | 2009-226401 A | 10/2009 |
| JP | 4618308 B2 | 1/2011 |
| JP | 2011-093774 A | 5/2011 |
| JP | 2012179589 A | 9/2012 |
| JP | 2012187571 A | 10/2012 |
| JP | 2015-073919 | 4/2015 |
| JP | 2016-019980 | 2/2016 |

OTHER PUBLICATIONS

Das et al.; Structure-Mechanics Property Relationship of Waste Derived Biochars; Science of the Total Environment; 538, 611-620; 2015.*

Google translation of JP2011093774A; Jun. 2022.*

Japanese Office Action dated Nov. 30, 2018 in corresponding Japanese Application No. 2018-501700.

Usmani, et al., Preparation and Liquid-Phase Characterization of Granular Activated-Carbon From Rice Husk, Bioresource Technology 48 (1994) 31-35.

International Search Report and Written Opinion issued in connection with International Patent Application No. PCT/JP2017/006363, dated May 23, 2017. (10 pages).

Usmani, Tanzil Haider, et al., Preparation and Liquid-Phase Characterization of Granular Activated-Carbon From Rice Husk, Bioresource Technology, 1994, vol. 48, p. 31-35, particularly, Methods, Fig. 1, Table 2. (5 pages).

Extended European Search Report dated Feb. 4, 2019 in corresponding European Application No. 17756482.0.

P.M. Yeletsky, et al., Synthesis of mesoporous carbons by leaching out natural silica templates of rice husks, Microporous and Mesoporous Materials 121 (2009) 34-40.

Gao, Yongwei et al. "Research progress of biomass carbonization molding technology", Solar Energy May 15, 2012 full text.

Liu, Shicai et al."Study On the Molding Charcoal From Solidified Biomass", Journal of Chemical Industry of Forest Products Oct. 15, 2002 full text.

P.M. Yeletsky et al. "Synthesis of mesoporous carbons by leaching out natural silica templates of rice husk",Microporous and Mesoporous Materials Jan. 6, 2009 full text.

Tanzil Haider Usmani et al. "Preparation and Liquid-Phase Characterization of Granular Activated-Carbon From Rice Husk",Bioresource Technology Dec. 31, 1994 full text.

Wu, Mingbo et al.,"Preparation of porous carbon from corncob by hot pressing treatment", Journal of Wuhan University of Science and Technology, Aug. 15, 2011 full text.

Chinese Office Action dated Jul. 28, 2021 in corresponding Chinese Application No. 2017800116495.

* cited by examiner

SOLIDIFIED POROUS CARBON MATERIAL AND METHOD OF MANUFACTURING THE SAME

CROSS-REFERENCE TO RELATED APPLICATIONS

The present application claims the benefit of International Application No. PCT/JP2017/006363, filed Feb. 21, 2017, which claims priority to Japanese Application Nos. 2016-031637, filed Feb. 23, 2016, and 2017-027603, filed Feb. 17, 2017, the disclosures of which are incorporated herein by reference.

BACKGROUND

The present disclosure relates to a solidified porous carbon material and a method of manufacturing the same.

A porous carbon material using a plant-derived material as a raw material, and a method of manufacturing the same, for example, are known from Japanese Patent No. 4618308. The method disclosed in this patent gazette is a method of manufacturing a porous carbon material in which a value of a specific surface area by a nitrogen BET method is equal to or larger than 10 m$^2$/gram, and a volume of a pore by a BJH method and an MP method is equal to or larger than 0.1 cm$^3$/gram. In this method, after the plant-derived material is carbonized at temperature of 800° C. to 1400° C., and the resulting carbonized plant-derived material is treated with an acid or an alkali, thereby removing silicon components in the plant-derived material after the carbonization.

SUMMARY

Technical Problems

The method of manufacturing the porous carbon material disclosed in the patent gazette described above is the excellent manufacturing method. However, since a sort of powdered chaff, for example, is used as the plant-derived material (raw material), the transport and the handling of the raw material and the porous carbon material become troublesome in some cases. In addition, since a value of a bulk density of the raw material is low, the treatment of the carbonization, and the treatment with the acid or alkali cannot be effectively carried out in some cases. In addition, as a matter of convenience of a manufacturing system, an amount of one treatment at the time of the manufacture is limited in some cases.

Therefore, it is an object of the present disclosure to provide a porous carbon material and a method of manufacturing the same in each of which transport and handling of a raw material and the porous carbon material, a treatment of carbonization, and a treatment with an acid or an alkali are caused to be more readily carried out.

Solution to Problems

A solidified porous carbon material of the present disclosure for attaining the object described above uses a plant-derived material as a raw material,
in which a bulk density of the solidified porous carbon material is in a range of 0.2 to 0.4 grams/cm$^3$, preferably 0.3 to 0.4 grams/cm$^3$, and
a value of a cumulative pore volume in a range of 0.05 to 5 μm in pore size based on a mercury press-in method is in a range of 0.4 to 1.2 cm$^3$, preferably 0.5 to 1.0 cm$^3$ per 1 gram of the solidified porous carbon material.

A method of manufacturing the solidified porous carbon material of the present disclosure for attaining the object described above includes: solidifying a plant-derived material next carbonizing the material at 400° C. to 1400° C. in the solidified state; and next treating the material with an acid or an alkali.

Advantageous Effects of Invention

Since the porous carbon material of the present disclosure is solidified, the transport and the handling of the porous carbon material can be more readily carried out. In addition, in the method of manufacturing the solidified porous carbon material of the present disclosure, the plant-derived material is solidified, next is carbonized at 400° C. to 1400° C. in a solidified state, and next is treated with the acid or alkali. Therefore, the transport and the handling of the raw material and the porous carbon material, the treatment of the carbonization, and the treatment with the acid or alkali can be more readily carried out. It should be noted that the effects described in this description are merely the exemplifications and are by no means limited thereto, and an additional effect may be offered.

DETAILED DESCRIPTION

Figure 1A:
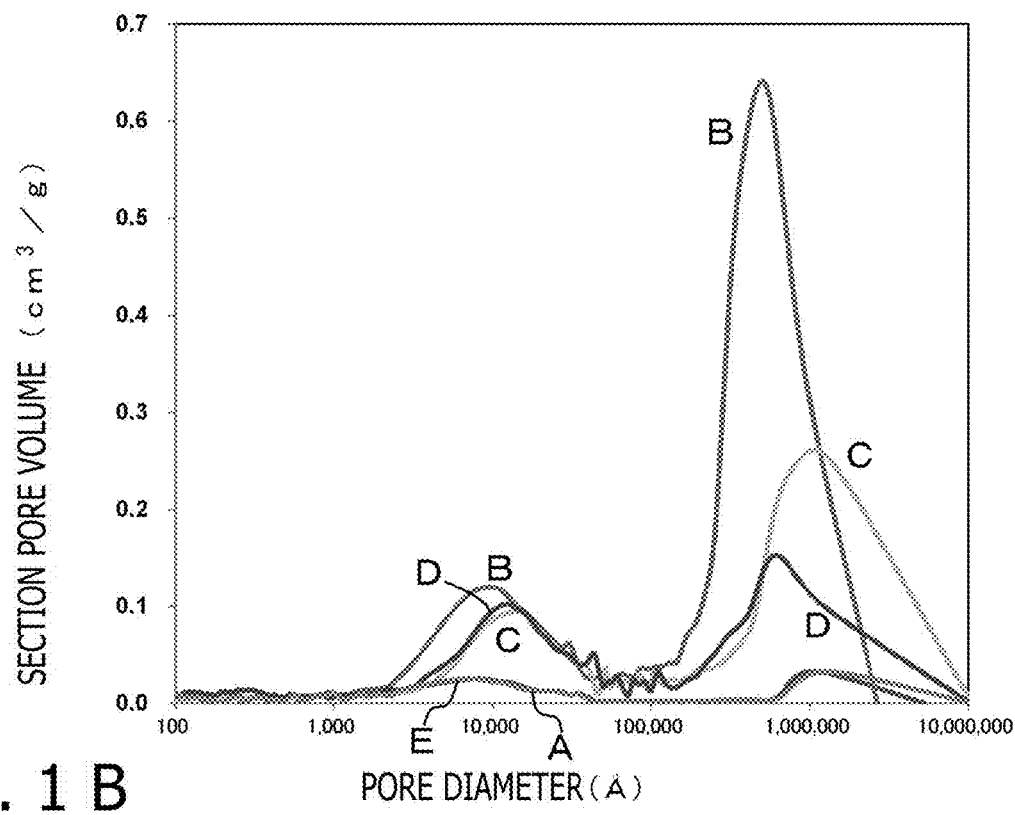
FIG. 1A and FIG. 1B are graphs depicting measurement results of a solidified porous carbon material of Example 1 based on a mercury press-in method.

Although hereinafter, the present disclosure will be described on the basis of Examples, the present disclosure is by no means limited to Examples and various numerical values, and materials in Example are merely exemplifications. It should be noted that the description will be given in accordance with the following order.

1. Explanation regarding whole of a solidified porous carbon material and a method of manufacturing the same of the present disclosure
2. Example 1 (a solidified porous carbon material and a method of manufacturing the same of the present disclosure)
3. Example 2 (a water filter and modified change thereof)
4. Others <Explanation Regarding Whole of a Solidified Porous Carbon Material and a Method of Manufacturing the Same of the Present Disclosure>

The method of manufacturing the solidified porous carbon material of the present disclosure can adopt a form in which: a bulk density of the solidified porous carbon material can be made in the range of 0.2 to 0.4 grams/cm$^3$, preferably in the range of 0.3 to 0.4 grams/cm$^3$. In addition, a value of a cumulative pore volume in the range of 0.05 to 5 μm in pore size based on a mercury press-in method can be made in the range of 0.4 to 1.2 cm$^3$, preferably, 0.5 to 1.0 cm$^3$ per 1 gram of the solidified porous carbon material.

Moreover, the solidified porous carbon material obtained by the solidified porous carbon material of the present disclosure including the preferred form or the method of manufacturing the same described above can adopt a form in which a value of a cumulative pore volume in the range of 10 μm or less in pore size based on the mercury press-in method can be made in the range of 0.7 to 2.0 cm$^3$, preferably, 0.7 to 1.7 cm$^3$ per 1 gram of the solidified porous carbon material.

Moreover, the solidified porous carbon material obtained by the solidified porous carbon material of the present disclosure including the various kinds of preferred forms or the method of manufacturing the same described above can adopt a form in which a value of a pore volume based on a BJH method is 0.1 cm$^3$ or more per 1 cm$^3$ of the solidified porous carbon material.

Moreover, the solidified porous carbon material obtained by the solidified porous carbon material of the present disclosure including the various kinds of preferred forms or the method of manufacturing the same described above can adopt a form in which a value of a pore volume based on an MP method is made in the range of 0.04 to 0.1 cm$^3$ per 1 cm$^3$ of the solidified porous carbon material.

Moreover, the solidified porous carbon material obtained by the solidified porous carbon material of the present disclosure including the various kinds of preferred forms or the method of manufacturing the same described above can adopt a form in which a value of a pore volume based on a BJH method is 0.3 cm$^3$ or more per 0.1 gram of the solidified porous carbon material. In addition, a value of the pore volume based on the MP method is made 0.1 cm$^3$ or more per 1 gram of the solidified porous carbon material.

Furthermore, the method of manufacturing the solidified porous carbon material of the present disclosure including the various kinds of preferred forms described above can adopt a form in which the bulk density of the solidified plant-derived material is made in the range of 0.2 to 1.4 grams/cm$^3$.

Furthermore, the method of manufacturing the solidified porous carbon material of the present disclosure including the various kinds of preferred forms described above can adopt a form in which the bulk density of the material carbonized in the solidified state (hereinafter referred to as "a porous carbon material precursor" in some cases) is made in the range of 0.2 to 0.8 grams/cm$^3$.

Furthermore, the method of manufacturing the solidified porous carbon material of the present disclosure including the various kinds of preferred forms described above can adopt a form in which when the plant-derived material is solidified, starch or dogtooth violet starch is used as a binder. Alternatively, it is only necessary that the binder is suitably selected from the materials each of which, for example, is not decomposed even if temperature of room temperature to 180° C. is applied when the plant-derived material is solidified, and is fired when the plant-derived material is carbonized at temperature of 400° C. to 1400° C. It is only necessary that the plant-derived material and the binder are mixed with each other by using a suitable mixer.

Furthermore, the solidified porous carbon material of the present disclosure including the various kinds of preferred forms described above can adopt a form in which a value of an ignition residue of the solidified porous carbon material is made equal to or larger than 0.1 mass % and equal to or smaller than 20 mass %. The method of manufacturing the solidified porous carbon material of the present disclosure including the various kinds of preferred forms described above can adopt a form in which the solidified porous carbon material is treated with an acid or an alkali, resulting in that the value of the ignition residue of the solidified porous carbon material is made equal to or larger than 0.1 mass % and equal to or smaller than 20 mass %, preferably equal to or larger than 0.1 mass % and equal to or smaller than 15 mass %, more preferably equal to or larger than 0.1 mass % and equal to or smaller than 2 mass %. It is only necessary that the ignition residue is measured on the basis of "Activated carbon test method" of JIS K1474:2014.

Furthermore, the solidified porous carbon material of the present disclosure including the various kinds of preferred forms described above can adopt a form in which an bulk density of the ignition residue of the solidified porous carbon material is made in the range of $1 \times 10^{-4}$ to $1 \times 10^{-1}$ grams/cm$^3$, preferably in the range of $1 \times 10^{-2}$ to $1 \times 10^{-1}$ grams/cm$^3$. In addition, the method of manufacturing the solidified porous carbon material of the present disclosure including the various kinds of preferred forms described above can adopt a form in which the bulk density of the ignition residue of the material carbonized in the solidified state (porous carbon material precursor) is made 0.1 grams/cm$^3$ or more, the bulk density of the ignition residue of the solidified porous carbon material is made in the range of $1 \times 10^{-4}$ to $1 \times 10^{-1}$ grams/cm$^3$, preferably in the range of $1 \times 10^{-2}$ to $1 \times 10^{-1}$ grams/cm$^3$.

Furthermore, destruction hardness of the solidified porous carbon material of the present disclosure including the various kinds of preferred forms described above is preferably 20 N or more. The destruction hardness of the solidified porous carbon material can be measured by using a Kiya hardness tester (manufactured by FUJIWARA SCIENTIFIC CO., LTD.: item number: 043019-C, this will also apply to the following). Specifically, it is only necessary that the destruction hardness of ten samples is measured, and except for the higher three samples and the lower three samples, the destruction hardness is derived from an average value of intermediate four samples (rounded off to the nearest integer).

In the solidified porous carbon material or the method of manufacturing the same of the present disclosure including the various kinds of forms described above (hereinafter, those will be generally referred to simply as "the present disclosure", in some cases), the porous carbon material uses the plant-derived material as the raw material. Although here, the plant-derived material can include the chaff or straw of rice (rice plant), barley, wheat, rye, barnyard grass, millet or the like, coffee beans, a tea leaf (for example, a leaf for green tea, red tea or the like), a sugar cane class (more specifically, strained lees of the sugar cane class), a corn class (more specifically, a core of the corn class), a skin of fruit (for example, a citrus peel such as an orange peel, a grapefruit peel, or a tangerine peel, a banana peel or the like), or a reed, and a stem seaweed, the present disclosure is by no means limited to those, and others, for example, the present disclosure can include a vascular plants vegetating on the land, a fern plant, a moss plant, alga, and seaweed. It should be noted that as the raw material, these materials may be individually used, or a plurality of kinds of them may be combined with one another to be used. Furthermore, the plant-derived material (for convenience, referred to as "a material-A") and, for example, a shell of the seed such as a coconut shell, or a walnut shell; a material such as woody sawdust of cedar, pine tree or bamboo (for convenience, referred to as "a material-B") may be mixed with each other and solidified. In this case, although a mixture ratio of the material-B to the material-A, for example, is preferably in terms of mass basis set as: 0.1≤(material-B)/(material-A) ≤10, the present disclosure is by no means limited to such a mass ratio. In addition, a shape or a form of the plant-derived material is also especially not limited and, for example, the chaff or straw itself may be available, or dried article may also be available. Moreover, in a food and beverage processing for bear or western liquor, articles subjected to various kinds of processing such as a fermentation process, a roasting process or an extraction process may also be used. In particular, from a viewpoint of promoting the recycle of the industrial wastes, the chaff or straw after processing such as the threshing is preferably used. The straw or chaff after processing of those, for example, can be readily available in bulk from the agricultural cooperative association, an alcoholic beverage producing company, a food company, or a food processing company.

In addition, before the solidification, the plant-derived material may be crushed to obtain a desired particle size depending on the desire, or may be classified. The plant-derived material may be previously cleaned. The porous carbon material precursor may be coarsely crushed to obtain a desired particle size or may be classified. The solidified porous carbon material of the present disclosure may be crashed to obtain the desired particle size or may be classified, and such crushed products or the classified products can also be applied to the various kinds of products.

In a method of manufacturing the solidified porous carbon material of the present disclosure (hereinafter, simply referred to as "the method of manufacturing the porous carbon material of the present disclosure" in some cases), a method of solidifying the plant-derived material can include a method of forming the plant-derived material into pellets by using a molding machine of a ring die system, a flat die system, or a screw system. In addition, there is also a method of solidifying the plant-derived material in a firewood shape or in a roll shape. After the plant-derived material is solidified once, the solidified porous carbon material may be crushed to obtain a suitable size. In addition, in the present disclosure, as a shape of the solidified porous carbon material, it is possible to exemplify a pellet shape (more specifically, a cylindrical shape having approximately 2 to 15 mm in diameter, and approximately 10 to 60 mm in length), the firewood shape (more specifically, a shape expressed by a product name of momigaraito (registered trademark), or a shape having approximately 50 mm in diameter, approximately 15 mm in central hole portion and, for example, 30 cm in length), and a coil shape (shape having approximately 50 mm in diameter, approximately 25 mm in central hole portion, approximately 20 mm in width, and approximately 0.30 cm in length), or a granular shape (diameter: 0.5 to 50 mm) obtained by crushing those can also be given.

In the method of manufacturing the porous carbon material of the present disclosure, after the acid treatment or the alkali treatment, a process for carrying out an activation treatment can be included, or after the activation treatment is carried out, the acid treatment or the alkali treatment may be carried out. In addition, in the method of manufacturing the porous carbon material of the present disclosure including such a preferred form, although depending on the plant-derived material to be used, before the solidified plant-derived material is carbonized, a heating treatment (pre-carbonization treatment) may be carried out for the plant-derived material in a state in which oxygen is cut off at a lower temperature (for example, 400° C. to 700° C.) than temperature for the carbonization. As a result, a tar component which will be produced in the process of the carbonization can be extracted, and as a result, the tar component which will be produced in the process of the carbonization can be reduced or removed away. Incidentally, for example, an atmosphere of inactive gas such as nitrogen gas or argon gas is obtained, or a vacuum atmosphere is obtained, or the plant-derived material is made to put into a sort of steamed and roasted state, thereby enabling the state in which oxygen is cut off to be attained. In addition, in the method of manufacturing the porous carbon material of the present disclosure, although depending on the plant-derived material to be used, for the purpose of reducing mineral components or moisture contained in the plant-derived material, and for preventing generation of offensive smell in the process of the carbonization, the solidified plant-derived material may be immersed in an acid or an alkali, or may be immersed in alcohol (for example, methyl alcohol, ethyl alcohol, or isopropyl alcohol) in some cases. In addition, in the case where the solidified plant-derived material is treated with the acid, for example, the solidified plant-derived material is treated with an inorganic acid such as a hydrochloric acid, a nitric acid or a sulfuric acid, thereby enabling the mineral components contained in the porous carbon material precursor to be removed away. It should be noted that in the method of manufacturing the porous carbon material of the present disclosure, thereafter, the pre-carbonization treatment may be carried out, in the method of manufacturing the porous carbon material of the present disclosure. The material for which the heat treatment is preferably carried out in the inactive gas, for example, can include a plant which generates a lot of wood vinegar (tar or light crude oil). In addition, the material for which a pre-treatment using alcohol or the like is preferably carried out, for example, can include seaweeds containing a lot of iodine or various kinds of minerals.

In the method of manufacturing the porous carbon material of the present disclosure, the plant-derived material is carbonized at 400° C. to 1400° C. Here, the carbonization generally means that an organic material (in the method of manufacturing the solidified porous carbon material of the present disclosure, the solidified plant-derived material) is subjected to the heat treatment to be converted into a carbonaceous material (for example, refer to JIS M0104-1984). It should be noted that the atmosphere for the carbonization can include an atmosphere in which oxygen is cut off, and specifically, can include a vacuum atmosphere, an atmosphere of inactive gas such as nitrogen gas or argon gas, and an atmosphere in which the plant-derived material is made to put into a sort of steamed and roasted state. As a rate of temperature rising up to the carbonization temperature, although not limited, 1° C./minute or more, preferably, 3° C./minute or more, more preferably 5° C./minute or more may be given under such an atmosphere. Although an upper limit of a period of time for the carbonization can include Len hours, preferably seven hours, more preferably five hours, the present disclosure is by no means limited thereto. It is only necessary that the lower limit of a period of time for the carbonization is set as a period of time for which the plant-derived material is reliably carbonized. A fungicide treatment may be carried out for the finally obtained porous carbon material. There is no limit to a type, a constitution, and a construction of a furnace which is used for the carbonization, and the furnace can be made a continuous furnace or can be made a batch furnace.

In the method of manufacturing the porous carbon material of the present disclosure, as described above, if the activation treatment is carried out, then, the number of micro pores each having a pore diameter smaller than 2 nm can be increased. A method of the activation treatment can include a gas activation method and a chemical activation treatment. Here, the gas activation method means a method in which by using oxygen, water vapor, carbon dioxide gas, air or the like as an activation agent, the porous carbon material is heated for several tens of minutes to several hours at 700° C. to 1400° C., preferably at 700° C. to 1000° C., more preferably 800° C. to 1000° C. under such a gas atmosphere, thereby developing a fine structure by using volatile components or carbon molecules in the porous carbon material. It should be noted that more specifically, although the heating temperature may be suitably set on the basis of the kind of plant-derived material, the kind of gas, the concentration of the gas, and the like, more preferably, the heating temperature is equal to or higher than 800° C. and equal to or lower than 950° C. The chemical activation method means a method in which instead of oxygen or water vapor used in the gas activation method, the activation is carried out by using sodium hydroxide, potassium hydroxide, zinc chloride, ferric chloride, calcium phosphate, calcium hydroxide, magnesium carbonate, potassium carbonate, sulfuric acid, or the like, the cleaning is carried out by using a hydrochloric acid, pH is adjusted by using an alkaline aqueous solution, and the drying is carried out.

A chemical treatment or molecular modification may be carried out for the surface of the solidified porous carbon material of the present disclosure (hereinafter, simply referred to as "the porous carbon material of the present disclosure" in some cases). The chemical treatment, for example, can include a treatment in which a carboxy group is produced on the surface by using a nitric acid treatment. In addition, by carrying out the treatment similar to the activation treatment using water vapor, oxygen, alkali or the like, various kinds of functional groups such as a hydroxyl group, a carboxy group, a ketone group, and an ester group can also be produced on the surface of the porous carbon material of the present disclosure. Moreover, the molecular modifications can also be carried out even by bringing about the chemical reaction between the porous carbon material of the present disclosure, and the chemical species having the hydroxyl group, the carboxy group, an amino group, and the like, or a protein which can react with the porous carbon material of the present disclosure.

In the method of manufacturing the porous carbon material of the present disclosure, the silicon components in the plant-derived material after the carbonization are removed away by carrying out the acid treatment or the alkali treatment. Here, the silicon components can include a silicon oxide such as a silicon dioxide, silica or a silicate. In such a manner, the porous carbon material of the present disclosure having the high specific surface area can be obtained by removing away the silicon components in the plant-derived material after the carbonization. The silicon components in the plant-derived material after the carbonization may be removed away on the basis of a dry etching method in some cases. The reduction of the value of the ignition residue can be promoted by removing away the silicon components. The value of the ignition residue of the solidified porous carbon material of the present disclosure is as described above.

The porous carbon material of the present disclosure has many pores. The pores include "a meso pore" having a pore diameter of 2 to 50 nm, "a macro pore" having a pore diameter exceeding 50 nm, and "a micro pore" having a pore diameter smaller than 2 nm. Specifically, the meso pores, for example, include many pores each having a pore diameter of 20 nm or less, especially, include many pores each having a pore diameter of 10 nm or less. In addition, the micro pores, for example, include many pores each having a pore diameter of approximately 1.9 nm, many pores each having a pore diameter of approximately 1.5 nm, and many pores each having a pore diameter of approximately 0.8 to 1 nm. In the porous carbon material of the present disclosure, it is desirable that the volume of the pore based on the BJH method is 0.3 $cm^3$ or more, preferably 0.5 $cm^3$ or more per 1 gram of the porous carbon material of the present disclosure. It is desirable that the volume of the pore based on the MP method is 0.1 $cm^3$ or more, preferably 0.2 $cm^3$ or more, more preferably 0.3 $cm^3$ or more per 1 gram of the porous carbon material of the present disclosure.

In the porous carbon material of the present disclosure, it is desirable that for the purpose of obtaining the more excellent functionality, the value of the specific surface area based on the nitrogen BET method (hereinafter, simply referred to as "the value of the specific surface area" in some cases) is 10 $m^2$ or more, preferably 50 $m^2$ or more, more preferably 100 $m^2$ or more, even more preferably 500 $m^2$ or more per 1 gram of the porous carbon material of the present disclosure. Alternatively, the value of the specific surface area based on the nitrogen BET method is desirably in the range of $2 \times 10^2$ to $3 \times 10^2$ $m^2$ per 1 $cm^3$ of the porous carbon material of the present disclosure.

The nitrogen BET method means a method in which an adsorbent (in this case, the porous carbon material) is made to adsorb/desorb nitrogen as adsorbed molecules, thereby measuring an adsorption isotherm, and the measured data is analyzed on the basis of a BET equation expressed by Expression (1). Thus, the specific surface area, the pore volume and the like can be calculated on the basis of this method. Specifically, in the case where the value of the specific surface area is calculated by using the nitrogen BET method, firstly, the porous carbon material is made to adsorb/desorb nitrogen as the adsorbed molecules, thereby obtaining the adsorption isotherm. Then, from the resulting adsorption isotherm, $[p/\{V_a(p_0-p)\}]$ is calculated on the basis of Expression (1) or Expression (1') obtained by deforming Expression (1), and a value of $[p/\{V_a(p_0-p)\}]$ is plotted against an equilibrium relative pressure $(p/p_0)$ Then, the resulting plot is regarded as a straight line, and a slope s $(=[(C-1)/(C \cdot V_m)])$ and an intercept i$(=[1/(C \cdot V_m)])$ are calculated on the basis of the least-squared method. Then, from the resulting slope s and intercept i, $V_m$ and C are calculated on the basis of Expression (2-1) and Expression (2-2). Moreover, from $V_m$, the specific surface area $a_{sBET}$ is calculated on the basis of Expression (3) (refer to a manual of BELSORP-mini and BELSORP analysis software manufactured by BEL JAPAN, INC., pp. 62 to 66). It should be noted that the nitrogen BET method is a measurement method based on JIS R 1626-1996 "A method of measuring a specific surface area by a gas adsorption BET method of fine ceramics powder."

$$V_a = (V_m \cdot C \cdot p)/[(p_0-p)\{1+(C-1)(p/p_0)\}] \qquad (1)$$

$$[p/\{V_a(p_0-p)\}] = [(C-1)/(C \cdot V_m)](p/p_0) + [1/(C \cdot V_m)] \qquad (1')$$

$$V_m = 1/(s+i) \quad (2\text{-}1)$$

$$C = (s/i) + 1 \quad (2\text{-}2)$$

$$a_{sBET} = (V_m \cdot L \cdot \sigma)/22414 \quad (3)$$

where
$V_a$: adsorption amount
$V_m$: adsorption amount of single molecule layer
p: pressure at the time of equilibrium of nitrogen
$p_0$: saturated vapor pressure of nitrogen
L: Avogadro's number
σ: adsorption cross-sectional area of nitrogen In the case where the pore volume $V_p$ is calculated on the basis of the nitrogen BET method, for example, the adsorption data of the resulting adsorption isotherm is subjected to the linear interpolation, and the relative pressure is set at the pore volume calculation relative pressure. Then, the adsorption amount V at the relative pressure thus set is obtained. From the adsorption amount V, the pore volume $V_p$ can be calculated on the basis of Expression (4) (refer to a manual of BELSORP-mini and BELSORP analysis software manufactured by BEL JAPAN, INC., pp. 62 to 65). It should be noted that the pore volume based on the nitrogen BET method will be hereinafter simply referred to as "the pore volume" in some cases.

$$V_p = (V/22414) \times (M_g/\rho_g) \quad (4)$$

where
V: adsorption amount at relative pressure
$M_g$: molecular weight of nitrogen
$\rho_g$: density of nitrogen The pore diameter of the meso pore, for example, can be calculated as a distribution of the pores from the pore volume change rate with respect to the pore diameter on the basis of the BJH method. The BJH method is a method which is widely used as the pore distribution analysis method. In the case where the pore distribution analysis is carried out on the basis of the BJH method, firstly, the porous carbon material is made to adsorb/desorb nitrogen as the adsorbed molecules, thereby obtaining a desorption isotherm. Then, on the basis of the resulting desorption isotherm, a thickness of the adsorbed layer when the adsorbed molecules are adsorbed/desorbed step by step from the state in which the pores are filled with the adsorbed molecules (for example, nitrogen), and an inner diameter of the pore (double of the core radius) generated in this state are obtained, the pore radius $r_p$ is calculated on the basis of Expression (5), and the pore volume is calculated on the basis of Expression (6). Then, the pore volume change rate ($dV_p/dr_p$) with respect to the pore diameter ($2r_p$) is plotted from the pore radius and the pore volume, thereby obtaining a pore distribution curve (refer to a manual of BELSORP-mini and BELSORP analysis software manufactured by BEL JAPAN, INC., pp. 35 to 88).

$$r_p = t + r_k \quad (5)$$

$$V_{pn} = R_n \cdot dV_n - R_n \cdot dt_n \cdot c \cdot \Sigma A_{pj} \quad (6)$$

where $$R_n = r_{pn}^2 / (r_{kn-1} + dt_n)^2 \quad (7)$$

Here,
$r_p$: pore diameter
$r_k$: core radius (inner diameter/2) in the case where adsorbed layer having thickness t is adsorbed on inner wall of pore having pore radius $r_p$ at pressure concerned
$V_{pn}$: pore volume when n-th time adsorption/desorption of nitrogen is occurred
$dV_n$: change amount at that time
$dt_n$: change amount of thickness $t_n$ of adsorbed layer when n-th time adsorption/desorption of nitrogen is occurred
$r_{kn}$: core radius at that time
c: fixed value
$r_{pn}$: pore radius when n-th time adsorption/desorption of nitrogen is occurred In addition, $\Sigma A_{pj}$ represents an integrated value of area of wall surface of pore from j=1 to j=n-1.

The pore diameters of the micro pores, for example, can be calculated in the form of a distribution of the pores from the pore volume change rate with respect to the pore diameter concerned on the basis of the MP method. In the case where the pore distribution analysis is carried out on the basis of the MP method, firstly, the porous carbon material is made to adsorb nitrogen, thereby obtaining the adsorption isotherm. Then, the resulting adsorption isotherm is converted into the pore volume with respect to the thickness t of the adsorbed layer (t-plot is carried out). Then, the pore distribution curve can be obtained on the basis of a curvature of the plot concerned (change amount of pore volume with respect to change amount of thickness t of adsorbed layer) (refer to a manual of BELSORP-mini and BELSORP analysis software manufactured by BEL JAPAN, INC., pp. 72, 73, and 82).

The measurement of the pores by the mercury press-in method is based on JIS R1655:2003 "A test method of a green compact pore diameter distribution of fine ceramics by a mercury press-in method." Specifically, the measurement based on the mercury press-in method was carried out by using POREMASTER 60GT (manufactured by Quantachrome company). A pore measurement area was set in the range of 3 nm to 200 μm. The measured section pore volumes are accumulated in the desired range, thereby enabling the cumulative pore volume to be calculated. The bulk density can be obtained on the basis of a method of measuring a packing density described in JIS K1474:2014 "Activated carbon test method." The bulk density of the ignition residue can be obtained by the product of the value of the bulk density and the value of the ignition residue. The ignition residue (residual ash) can be measured on the basis of a method of measuring ignition residue described in JIS K1474:2014 "Activated ash test method." It is desirable that the value of the ignition residue (residual ash) in the solidified porous carbon material of the present disclosure is 20 mass % or less, preferably 15 mass % or less. In addition, it is desirable that the value of the ignition residue (residual ash) in the porous carbon material precursor is 20 mass % or more, preferably 25 mass % or more.

The porous carbon material precursor is subjected to the acid treatment or the alkali treatment. In this case, the concrete treatment method, for example, can include a method of immersing the porous carbon material precursor in an acid aqueous solution or an alkali aqueous solution, and a method of reacting the porous carbon material precursor, and the acid or alkali in the gas phase. More specifically, in case of the acid treatment, the acid, for example, can include a fluorine compound exhibiting acidity such as hydrogen fluoride, hydrofluoric acid, ammonium fluoride, calcium fluoride, or sodium fluoride. In the case where the fluorine compound is used, it is only necessary that the fluorine element becomes four times in mass with respect to the silicon element in the silicon components contained in the porous carbon material precursor, and the concentration of the fluorine compound aqueous solution is preferably 10 mass % or more. In the case where the silicon components (for example, a silicon dioxide) contained in the porous carbon material precursor are removed away by using the hydrofluoric acid, the silicon dioxide reacts the hydrofluoric acid as depicted in a chemical formula (A) or a chemical formula (B) to be removed away in the form of hexafluorosilicate ($H_2SiF_6$) or silicon tetrafluoride ($SiF_4$), thereby enabling the porous carbon material to be obtained. Then, hereinafter, it is only necessary to carry out the cleaning and the drying.

$$SiO_2+6HF \rightarrow H_2SiF_6+2H_2O \quad (A)$$

$$SiO_2+4HF \rightarrow SiF_4+2H_2O \quad (B)$$

In addition, in case of the alkali treatment for carrying out a treatment by using alkali (base), alkali, for example, can include sodium hydroxide. In the case where the alkali aqueous solution is used, all it takes is that pH of the aqueous solution is 11 or more. In the case where the silicon components (for example, a silicon dioxide) contained in the porous carbon material precursor is intended to be removed away by using a sodium hydroxide aqueous solution, the silicon dioxide is made to react the sodium hydroxide as depicted in a chemical formula (C) and is removed away in the form of sodium silicate ($Na_2SiO_3$) by heating the sodium hydroxide aqueous solution, thereby enabling the porous carbon material to be obtained. Further, in the case where the treatment is carried out by making sodium hydroxide react in the gas phase, the silicon dioxide is thereby made to react the sodium hydroxide as depicted in a chemical formula (C) and is removed away in the form of sodium silicate ($Na_2SiO_3$) by heating a solid of the sodium hydroxide, thereby enabling the porous carbon material to be obtained. Then, hereinafter, it is only necessary to carry out the cleaning and the drying.

$$SiO_2+2NaOH \rightarrow Na_2SiO_3+H_2O \quad (C)$$

A functional material may be stuck to the porous carbon material of the present disclosure. Specifically, after the acid treatment or the alkali treatment is carried out (after that, in the case where the activation treatment is carried out, after the activation treatment is carried out), it is only necessary that the functional material is stuck to the solidified porous carbon material of the present disclosure. The functional material, for example, can include a drug (specifically, for example, ethylene urea, a phosphoric acid, or copper nitrate). Alternatively, the functional material can adopt a form exhibiting the photocatalytic properties. In the latter case, the functional material, for example, can include a titanium oxide ($TiO_2$) or a zinc oxide (ZnO). It should be noted that by using ethylene urea, formaldehyde and acetaldehyde can be effectively removed away, by using the phosphoric acid, ammonia can be effectively removed away, and by using a copper nitrate, ammonia, hydrogen sulfide or the like can be effectively deodorized. Then, as a result, the porous carbon material is given the catalytic properties, and the porous carbon material can be applied as a hazardous material decomposition agent or the hazardous substance removing agent which can be semi-permanently used by the photocatalytic effect. It is only necessary that for the decomposition or removal of the hazardous material, the porous carbon material is irradiated with an energy line or an electromagnetic wave (for example, ultraviolet rays, sunlight, visible light or the like). The hazardous material can include the hazardous substance existing in the air. Specifically, various kinds of viruses, an allergy cause substance, and a carcinogen (for example, benzopyrene) contained in the smoke of a tobacco can be exemplified as the hazardous material.

Although depending on the kind, constitution, construction, and form of the functional material, a form of sticking of the functional material to the porous carbon material can include a state in which the functional material is stuck as the particles to the surface (including an inside of the pores) of the porous carbon material, a state in which the functional material is stuck as the thin film shape to the surface of the porous carbon material, and a state in which the functional material is stuck as the sea/island shape to the surface of the porous carbon material (in the case where the surface of the porous carbon material is regarded as "the sea," the functional material corresponds to "the island"). It should be noted that the sticking means a phenomenon of the bonding between the different kinds of materials. The method of sticking the functional material to the solidified porous carbon material of the present disclosure can include a first method to a fifth method. In this case, in the first method, the porous carbon material is immersed in the liquid solution containing the functional material to precipitate the functional material on the surface of the porous carbon material. In the second method, the functional material is precipitated on the surface of the porous carbon material by a non-electrolytic plating method (chemical plating method) or a chemical reduction reaction. In the third method, the porous carbon material is immersed in the liquid solution containing the precursor of the functional material, and a heat treatment is carried out, thereby precipitating the functional material on the surface of the porous carbon material. In the fourth method, the porous carbon material is immersed in the liquid solution containing the precursor of the functional material, and an ultrasonic wave treatment is carried out, thereby precipitating the functional material on the surface of the porous carbon material. In addition, in the fifth method, the porous carbon material is immersed in the liquid solution containing the precursor of the functional material, and a sol-gel reaction is carried out, thereby precipitating the functional material on the surface of the porous carbon material.

Although for the solidified porous carbon material of the present disclosure, for example, the application to the use in a water filter, a water filter cartridge or the like, the use in an air cleaner, an application to a filter member (a filter of an air cleaner or a filter of a water filter) can be exemplified, the application field is by no means limited thereto. Alternatively, the solidified porous carbon material of the present disclosure can also be applied to cosmetics, foods, a filter of a tobacco, a complex to which a drug is imbued (the porous carbon material with an impregnated agent) or the like.

For example, in the use in the water filter, it is only necessary that the solidified porous carbon material of the present disclosure is used as a filter medium. In addition, the solidified porous carbon material may be cleaned with the acid or alkali to adjust pH to be used. With the solidified porous carbon material of the present disclosure, the various kinds of materials can be removed away, for example, in the water containing a material having a molecular weight of $1 \times 10^2$ to $1 \times 10^5$, the water containing dodecyl benzene sulfonate, the water containing chlorothalonil, the water containing dichlorovos, the water containing tetracycline, the water containing soluble lead, the water containing free chlorine, and the water containing total organic halogen.

In the case where the solidified porous carbon material is used in purification of the water and the air, and generally in purification of the fluid, the use in the sheet-shape, the use in a state of sticking to the polyurethane foam, the use in a state of filling in the column or the cartridge, the use in a state of putting in a bag having permeability, the use in a state of shaping into a desired shape by using binder or the like, and the use in a state of powder can be exemplified as the use form of the solidified porous carbon material (or, the pulverized product in some cases) of the present disclosure. In the case where the material dispersed in the liquid solution is intended to be removed away, the surface of the solidified porous carbon material can be subjected to a hydrophilic treatment or a hydrophobic treatment to be used. In the use in the sheet shape, a support member can include a woven fabric or a non-woven fabric, and a material composing a support member can include cellulose, polypropylene, and polyester. Then, it is possible to give a form in which the porous carbon material is held between the support member and the support member, and a form in which the porous carbon material is kneaded into the support member.

In case of the water filter, the water filter can have a structure further having a filter film (for example, a hollow fiber membrane or a flat sheet membrane in which holes each having a diameter of 0.4 to 0.01 µm) (a combination of the solidified porous carbon material of the present disclosure, and the filter film), and can have a structure further having a reverse osmosis membrane (RO) (a combination of the solidified porous carbon material of the present disclosure, and the reverse osmosis membrane). In addition, the water filter can have a structure further having a ceramic filter medium (a ceramic filter medium having fine holes) (a combination of the solidified porous carbon material of the present disclosure, and the ceramic filter medium), and can have a structure further having an ion-exchange resin (a combination of the solidified porous carbon material of the present disclosure, and the ion-exchange resin). It should be noted that although in general, the mineral components are hardly contained in the filtered water passing through the reverse osmosis membrane (RO) after passing through the reverse osmosis membrane (RO) the filtered water is made to pass through the solidified porous carbon material of the present disclosure, resulting in that the mineral components can be contained in the filtered water.

The kind of the water filter can include a continuous water filter, a batch water filter, and a reverse osmosis membrane water filter. Alternatively, the kind of the water filter can include a faucet direct attachment type water filter in which a water filter main body is directly attached to a head portion of a faucet, a stationary type water filter (referred to as a top sink type water filter or a desk-top type water filter as well), a faucet-integrated type water filter in which the water filter is incorporated in a water faucet, and an under-sink type water filter (built-in type water filter) which is installed inside a sink of a kitchen. In addition, the kind of the water filter can include a pot type water filter (pitcher type water filter) in which the water filter is incorporated in a container such as a pot or a pitcher, a central type water filter which is directly attached to a water pipe distributed from a water meter, a portable type water filter, and a straw type water filter. The constitution and the construction of the water filter can be made the same as those of the past water filter. In the water filter, the solidified porous carbon material of the present disclosure, for example, can be put in a cartridge to be used. In this case, it is only necessary that the cartridge is provided with a water inflow portion and a water discharge portion. "The water" which should be made a target of the purification in the water filter is by no means limited to "the water" which is prescribed in "3. Terms and definition" of JIS S3201:2010 "Domestic water filter test method."

Alternatively, a member suitable for incorporating the solidified porous carbon material of the present disclosure can include a cap or a cover in a bottle (so-called a plastic bottle), a laminated container, a plastic container, a glass container, a glass bottle or the like with a cap, a cover, a straw member, or a spray member. Here, the liquid or water (such as drinking water or skin lotion) within the bottle, the laminated container, the plastic container, the glass container, the glass bottle or the like in which the solidified porous carbon material of the present disclosure is disposed is made to pass through the solidified porous carbon material of the present disclosure disposed inside the cap or the cover to be drunk or used, thereby enabling the mineral components to be contained in the filtered water. Alternatively, it is also possible to adopt a form in which the filter medium including the solidified porous carbon material of the present disclosure is stored in a bag having the permeability, and this bag is put into the liquid or water (such as the drinking water or the skin lotion) within the various kinds of containers such as the bottle (so-called the plastic bottle), the laminated container, the plastic container, the glass container, the glass bottle, the pot, and the pitcher.

EXAMPLE 1

Example 1 relates to a solidified porous carbon material and a method of manufacturing the same of the present disclosure.

In a method of manufacturing a solidified (specifically, pelletized) porous carbon material of Example 1, the chaff was used as the plant-derived material. Then, the chaff as the pellet-shaped solidified plant-derived material was solidified by using a pellet machine, specifically, to obtain the pellet-shaped solidified plant-derived material having approximately a cylindrical shape having an average diameter of 6 mm, and an average length of 30 mm. It should be noted that during the solidification, no binder is used. The bulk density of the solidified plant-derived material was in the range of 0.2 to 1.4 grams/cm$^3$, specifically, 0.7 grams/cm3. Next, in the solidified state, the solidified plant-derived material was carbonized at 400° C. to 1400° C. Specifically, the solidified plant-derived material was carbonized at 500° C. for three hours under the nitrogen atmosphere by using a mantle heater. The bulk density of the material (porous carbon material precursor) carbonized in the solidified state was in the range of 0.2 to 0.8 grams/cm$^3$, specifically, 0.5 grams/cm$^3$. In addition, the ignition residue of the material carbonized in the solidified state was 42%, and the bulk density of the ignition residue was 0.1 grams/cm$^3$ or more, specifically, 0.50 grams/cm$^3$×0.42=0.21 grams/cm3. In addition, the destruction hardness was measured by using the Kiya hardness tester, which proved that the destruction hardness was 73 N. Thereafter, the material carbonized in the solidified state was immersed in 1 mole/liter of the sodium hydroxide aqueous solution at 80° C., and was stirred for 24 hours. Next, the cleaning was carried out until the aqueous solution became neutral, and the resulting solidified porous carbon material was filtered and was then dried at 120° C. for 24 hours.

Then, the classification was carried out by using sieves of 20 mesh and 200 mesh, and samples depicted in following TABLE 1 were obtained. Moreover, the activation treatment based on the gas activation method, specifically, the activation treatment using the water vapor at 900° C. for two hours was carried out for the solidified porous carbon material of Example 1A to obtain Example 1C. In addition, the activation treatments based on the gas activation method, specifically, the activation treatments using the water vapor at 900° C. for two hours and three hours were carried out for the solidified porous carbon material of Example 1B to obtain Example 1D and Example 1E. A value of the ignition residue of the solidified pore carbon material (Example 1A) obtained by carrying out the acid or alkali treatment was equal to or larger than 0.1 mass % and equal to or smaller than 20 mass %, specifically, 9.3 mass %. In addition, the destruction hardness of Example 1A was 35 N.

<TABLE 1>
Example 1A: 20 mesh-on product (before water vapor activation)
Example 1B: 20 mesh-pass, 200 mesh-on product (before water vapor activation)
Example 1C: water vapor activation product of Example 1A
Example 1D: water vapor activation product of Example 1B
Example 1E: water vapor activation product of Example 1B Even in case of manufacture of Example 1F, Example 1G, Example 1H, Example 1J, Example 1K, Example 1L, and Example 1M, the chaff was used as the plant-derived material. Then, the chaff as the plant-derived material was solidified by using a pellet machine, specifically, to obtain the pellet-shaped solidified plant-derived material having approximately a cylindrical shape having an average diameter of 6 mm, and an average length of 30 mm. It should be noted that during the solidification, no binder is used. The bulk density of the solidified plant-derived material was in the range of 0.2 to 1.4 grams/cm$^3$, specifically, 0.7 grams/cm3. Next, in the solidified state, the solidified plant-derived material was carbonized at 400° C. to 1400° C. However, unlike the sample described above, specifically, the solidified plant-derived material was carbonized at 800° C. for one hour under the nitrogen gas atmosphere by using a muffle furnace. The bulk density of the material (porous carbon material precursor) carbonized in the solidified state was in the range of 0.2 to 0.8 grams/cm$^3$, specifically, 0.46 grams/cm$^3$. In addition, the ignition residue of the material carbonized in the solidified state was 44%, and the bulk density of the ignition residue was 0.1 grams/cm$^3$ or more, specifically, 0.46 grams/cm$^3$×0.44=0.20 grams/cm3. In addition, the destruction hardness was measured by using the Kiya hardness tester, which proved that the destruction hardness was 120 N. Thereafter, the material carbonized in the solidified state was immersed in 1 mole/liter of the sodium hydroxide aqueous solution at 80° C., and was stirred for 24 hours. Next, the cleaning was carried out until the aqueous solution became neutral, and the resulting solidified porous carbon material was filtered and was then dried at 120° C. for 24 hours.

Next, the resulting solidified porous carbon material was classified by using the sieves to obtain a 3 mm-on product, and 1 mm-on, a 3 mm-pass product (referred to as 1 to 3 mm products). Then, the activation treatment based on the gas activation method, specifically, the activation treatment using the water vapor at 860° C. for two hours was carried out from the 3 mm-on product, thereby obtaining the solidified porous carbon material of Example 1F. Moreover, the solidified porous carbon material of Example 1F was cleaned by using the water and was then dried at 120° C., thereby obtaining the solidified porous carbon material of Example 1G. In addition, the activation treatment using the water vapor at 860° C. for 2.5 hours was carried out for the 3 mm-on product, thereby obtaining the solidified porous carbon material of Example 1H. Moreover, the solidified porous carbon material of Example 1H was cleaned by using the water and was then dried at 120° C., thereby obtaining the solidified porous carbon material of Example 1J. Moreover, after the activation treatment using the water vapor at 850° C. for three hours was carried out for the 3 mm-on product, the cleaning was carried out by using the water and the drying was then carried out at 120° C., thereby obtaining the solidified porous carbon material of Example 1K. On the other hand, the activation treatment based on the gas activation method, specifically, the activation treatment using the water vapor at 860° C. for two hours was carried out for the 1 to 3 mm products, thereby obtaining the solidified porous carbon material of Example 1L. Then, the solidified porous carbon material of Example 1L was cleaned by using the water and was then dried at 120° C., thereby obtaining the solidified porous carbon material of Example 1M. The results of measurement of the destruction hardness of the resulting Example 1F, Example 1G, Example 1H, Example 1J, and Example 1K by using the Kiya hardness tester are depicted below.

|  | Destruction hardness |
| --- | --- |
| Example 1F | 81 N |
| Example 1G | 77 N |
| Example 1H | 66 N |
| Example 1J | 75 N |
| Example 1K | 73 N |

Even in case of the manufacture of Example 1N, Example 1P, Example 1Q, Example 1R, and Example 1S, the chaff was used as the plant-derived material. Then, the chaff as the plant-derived material was solidified by using a pellet machine, specifically, to obtain the pellet-shaped solidified plant-derived material having approximately a cylindrical shape having an average diameter of 6 mm, and an average length of 30 mm. It should be noted that during the solidification, no binder is used. The bulk density of the solidified plant-derived material was in the range of 0.2 to 1.4 grams/cm$^3$, specifically, 0.67 grams/cm$^3$. Next, in the solidified state, the solidified plant-derived material was carbonized at 400° C. to 1400° C. Specifically, the solidified plant-derived material was carbonized at 600° C. for 0.5 hours under the nitrogen atmosphere by using a rotary kiln. The bulk density of the resulting material (porous carbon material precursor) carbonized in the solidified state was in the range of 0.2 to 0.8 grams/cm$^3$, specifically, 0.55 grams/cm$^3$. In addition, the ignition residue of the material carbonized in the solidified state was 40%, and the bulk density of the ignition residue was 0.1 grams/cm$^3$ or more, specifically, 0.55 grams/cm$^3$×0.40=0.22 grams/cm$^3$.

Next, the activation treatment based on the gas activation method, specifically, the activation treatments using the water vapor at 850° C. for 3.5 hours (Example 1N), for 4.0 hours (Example 1P), for 4.75 hours (Example 1Q), for 5.5 hours (Example 1R), and for 5.75 hours (Example 1S) were carried out. Thereafter, the material carbonized in the solidified state was immersed in 4.0 moles/liter of the sodium hydroxide aqueous solution at 50° C., and was stirred for 12 hours. Next, the cleaning was carried out until the aqueous solution became neutral by using a hydrochloric acid, and the resulting solidified porous carbon material was filtered and was then dried at 120° C. for 24 hours. The five kinds of solidified porous carbon materials obtained in such a manner were set as Example 1N, Example 1P, Example 1Q, Example 1R, and Example 1S.

For comparison, the chaff which was not solidified (that is, the chaff held in a state as it was) was carbonized at 500° C. for three hours under the nitrogen atmosphere by using the mantle heater. The bulk density of the resulting material which was not solidified was 0.1 grams/cm$^3$. In addition, the ignition residue was 42%, and the bulk density of the ignition residue was 0.04 grams/cm$^3$. Therefore, the carbonized material in a state of being not solidified was immersed in 1 mole/liter of the sodium hydroxide aqueous solution at 80° C. and was stirred for 24 hours. Next, the cleaning was carried out until the aqueous solution became neutral, and the resulting porous carbon material which was not solidified was filtered and was then dried at 120° C. for 24 hours. Then, the classification was carried out by using the sieves of 20 mesh and 200 mesh, and samples of Comparative Example 1B depicted in following TABLE 2 as 20 mesh-pass 200 mesh-on products. It should be noted that the 20 mesh-on product was hardly obtained. In addition, the chaff which was not solidified (that is, the chaff held as it was) was carbonized by using a natural type carbonization furnace. The bulk density of the resulting material in the state of being not solidified was 0.11 grams/cm$^3$. In addition, the ignition residue was 36%, and the bulk density of the ignition residue was 0.04 grams/cm$^3$. Therefore, the carbonized material in a state of being not solidified was immersed in 1 mole/liter of the sodium hydroxide aqueous solution at 80° C. and was stirred for 24 hours. Next, the cleaning was carried out until the aqueous solution became neutral and the resulting porous carbon material which was not solidified was filtered and was then dried at 120° C. for 24 hours. Then, the classification was carried out by using the sieves of 20 mesh and 200 mesh, and Comparative Example 1C depicted in following TABLE 2 is obtained as 20 mesh-pass 200 mesh-on products. Moreover, the activation treatments using the water vapor at 900° C. for two hours and for three hours were carried out for resulting Comparative Example 1C, thereby obtaining Comparative Example 1D and Comparative Example 1E. The commercially available material was used in Comparative Example 1F to Comparative Example 1J. In addition, since in Reference Example 1A to Reference Example 1D, in the first place, the raw material was not the plant-derived raw material, Reference Example 1A to Reference Example 1D were given as Reference Examples. When the destruction hardness of Comparative Example 1B was measured, Comparative Example 1B was destroyed just after the start of the test, and thus the measurement could not be carried out.

<TABLE 2>
Comparative Example 1B: 20 mesh-pass, 200 mesh-on product
Comparative Example 1C: chaff which is not solidified is used as raw material
Comparative Example 1D: water vapor activation product of Comparative Example 1C
Comparative Example 1E: water vapor activation product of Comparative Example 1C
Comparative Example 1F: Kuraray Coal GW manufactured by KURARAY CHEMICAL CO., LTD. (60 mesh or more, 30 mesh or less)
Comparative Example 1G: Kuraray Coal GG manufactured by KURARAY CHEMICAL CO., LTD. (60 mesh or more, 30 mesh or less)
Comparative Example 1H: TSURUMI COAL CO., LTD. 4GS-S (coconut shell coal briquettes)
Comparative Example 1J: SWKW manufactured by SANWA Co., Ltd. (wood activated carbon)
Reference Example 1A: UN 8 to 32 mesh manufactured by UNION SERVICE Co., LTD. (coal crushing)
Reference Example 1B: UP 4 to 6 mesh manufactured by UNION SERVICE Co., LTD. (coal pellet)
Reference Example 1C: Activated carbon, crushing, 2 to 5 mm, publisher code 031-18061 manufactured by Wako Pure Chemical Industries, Ltd. (peat crushing)
Reference Example 1D: Activated carbon, powder, neutrality publisher code 035-18101 manufactured by Wako Pure Chemical Industries, Ltd. (peat powder)

The various kinds of physical property measured values of Example 1A to Example 1E, Comparative Example 1B to Comparative Example 1J, and Reference Example 1A to Reference Example 1D are depicted in following TABLE 3. Incidentally, in TABLE 3, "mercury press-in method-A" depicts a value of a cumulative pore volume per 1 gram of the solidified porous carbon material in the range of 10 μm or less in pore size based on the mercury press-in method. "Mercury press-in method-B" depicts a value of a cumulative pore volume per 1 gram of the solidified porous carbon material in the range of 0.05 to 5 μm in pore size based on the mercury press-in method. In addition, "pore volume-A" depicts a value of a cumulative pore volume per 1 cm$^3$ of the solidified porous carbon material in the range of 10 μm or less in pore size based on the mercury press-in method. "Pore volume-B" depicts a value of a cumulative pore volume per 1 cm$^3$ of the solidified porous carbon material in the range of 0.05 to 5 μm in pore size based on the mercury press-in method.

TABLE 3

| | Mercury press-in method | | Pore volume | | Per 1 g of weight | | | |
|---|---|---|---|---|---|---|---|---|
| | -A cm$^3$/g | -B cm$^3$/g | -A cm$^3$/cm$^3$ | -B cm$^3$/cm$^3$ | Specific area m$^2$/g | Total pore volume cm$^3$/g | BJH cm$^3$/g | MP cm$^3$/g |
| Example | | | | | | | | |
| 1A | 0.72 | 0.48 | 0.317 | 0.211 | 512 | 0.50 | 0.36 | 0.16 |
| 1B | 0.81 | 0.51 | 0.356 | 0.226 | — | — | — | — |
| 1C | 1.03 | 0.77 | 0.268 | 0.200 | 964 | 0.95 | 0.65 | 0.27 |
| 1D | 1.66 | 0.98 | 0.349 | 0.206 | 1028 | 1.09 | 0.77 | 0.28 |
| 1E | 1.36 | 1.18 | 0.258 | 0.224 | 1001 | 1.22 | 0.93 | 0.21 |
| 1F | 0.87 | 0.57 | 0.244 | 0.158 | 911 | 0.68 | 0.38 | 0.31 |
| 1G | 0.85 | 0.54 | 0.204 | 0.130 | 1057 | 0.75 | 0.39 | 0.38 |
| 1H | 1.08 | 0.66 | 0.270 | 0.164 | 1063 | 0.81 | 0.46 | 0.36 |
| 1J | 1.11 | 0.71 | 0.244 | 0.155 | 1232 | 0.99 | 0.58 | 0.41 |
| 1K | 1.38 | 0.75 | 0.207 | 0.113 | 1198 | 1.12 | 0.75 | 0.33 |

TABLE 3-continued

| | | | | | | | | |
|---|---|---|---|---|---|---|---|---|
| 1L | 1.47 | 0.94 | 0.264 | 0.170 | 1151 | 0.94 | 0.56 | 0.37 |
| 1M | 1.51 | 1.01 | 0.242 | 0.101 | 1383 | 1.19 | 0.74 | 0.43 |
| 1N | 1.29 | 0.68 | 0.304 | 0.160 | 791 | 0.71 | 0.46 | 0.20 |
| 1P | 1.30 | 0.72 | 0.308 | 0.171 | 813 | 0.72 | 0.45 | 0.22 |
| 1Q | 1.47 | 0.77 | 0.330 | 0.174 | 857 | 0.71 | 0.43 | 0.27 |
| 1R | 1.68 | 0.91 | 0.356 | 0.200 | 902 | 0.72 | 0.42 | 0.30 |
| 1S | 1.51 | 0.79 | 0.325 | 0.171 | 913 | 0.69 | 0.39 | 0.31 |
| Comparative Example | | | | | | | | |
| 1B | 2.01 | 1.40 | 0.221 | 0.154 | 495 | 0.41 | 0.27 | 0.17 |
| 1C | 1.67 | 1.28 | 0.200 | 0.154 | 528 | 0.41 | 0.27 | 0.26 |
| 1D | 2.32 | 1.74 | 0.255 | 0.191 | 966 | 0.78 | 0.50 | 0.35 |
| 1E | 3.48 | 2.47 | 0.278 | 0.198 | 1328 | 1.27 | 0.89 | 0.37 |
| 1F | 0.29 | 0.21 | 0.148 | 0.107 | 929 | 0.41 | 0.06 | 0.40 |
| 1G | 0.25 | 0.24 | 0.115 | 0.110 | 1138 | 0.52 | 0.10 | 0.47 |
| 1H | 0.49 | 0.27 | 0.220 | 0.121 | 1297 | 0.60 | 0.12 | 0.57 |
| 1J | 2.69 | 1.36 | 0.511 | 0.259 | 1311 | 1.01 | 0.65 | 0.64 |
| Reference Example | | | | | | | | |
| 1A | 0.49 | 0.28 | 0.209 | 0.121 | 1038 | 0.55 | 0.19 | 0.51 |
| 1B | 0.49 | 0.30 | 0.222 | 0.135 | 1049 | 0.48 | 0.10 | 0.46 |
| 1C | 0.85 | 0.62 | 0.268 | 0.197 | 645 | 0.45 | 0.24 | 0.26 |
| 1D | 1.12 | 0.60 | 0.498 | 0.266 | 628 | 0.53 | 0.33 | 0.21 |

| | Per 1 $cm^3$ of volume | | | | | | Bulk density of ignition residue $g/cm^3$ |
|---|---|---|---|---|---|---|---|
| | Specific area $m^2/cm^3$ | Total pore volume $cm^3/cm^3$ | BJH $cm^3/cm^3$ | MP $cm^3/cm^3$ | Bulk density $g/cm^3$ | Ignition residue % | |
| Example | | | | | | | |
| 1A | 225 | 0.220 | 0.158 | 0.070 | 0.44 | 9.3 | 0.0409 |
| 1B | — | — | — | — | — | — | — |
| 1C | 251 | 0.247 | 0.169 | 0.070 | 0.26 | 15.0 | 0.0390 |
| 1D | 216 | 0.229 | 0.162 | 0.059 | 0.21 | 16.0 | 0.0336 |
| 1E | 190 | 0.232 | 0.177 | 0.040 | 0.19 | 17.0 | 0.0323 |
| 1F | 255 | 0.190 | 0.106 | 0.087 | 0.28 | 9.0 | 0.0252 |
| 1G | 254 | 0.180 | 0.094 | 0.091 | 0.24 | 4.0 | 0.0096 |
| 1H | 266 | 0.203 | 0.115 | 0.090 | 0.25 | 15.0 | 0.0375 |
| 1J | 271 | 0.218 | 0.128 | 0.090 | 0.22 | 5.0 | 0.0110 |
| 1K | 180 | 0.168 | 0.113 | 0.050 | 0.15 | 6.0 | 0.0090 |
| 1L | 207 | 0.169 | 0.101 | 0.067 | 0.18 | 14.0 | 0.0252 |
| 1M | 221 | 0.190 | 0.118 | 0.069 | 0.16 | 4.0 | 0.0064 |
| 1N | 187 | 0.167 | 0.108 | 0.047 | 0.24 | 1.1 | 0.0025 |
| 1P | 192 | 0.169 | 0.107 | 0.051 | 0.24 | 1.1 | 0.0027 |
| 1Q | 193 | 0.160 | 0.097 | 0.060 | 0.22 | 1.0 | 0.0023 |
| 1R | 191 | 0.152 | 0.090 | 0.064 | 0.21 | 1.3 | 0.0027 |
| 1S | 197 | 0.149 | 0.084 | 0.066 | 0.22 | 2.7 | 0.0058 |
| Comparative Example | | | | | | | |
| 1B | 54 | 0.045 | 0.030 | 0.019 | 0.11 | 4.2 | 0.0046 |
| 1C | 58 | 0.045 | 0.029 | 0.029 | 0.12 | 3.1 | 0.0037 |
| 1D | 106 | 0.086 | 0.055 | 0.039 | 0.11 | 6.6 | 0.0073 |
| 1E | 106 | 0.102 | 0.071 | 0.030 | 0.08 | 8.8 | 0.0070 |
| 1F | 474 | 0.211 | 0.031 | 0.204 | 0.51 | 0.04 | 0.0002 |
| 1G | 523 | 0.239 | 0.046 | 0.216 | 0.46 | 0.8 | 0.0036 |
| 1H | 584 | 0.270 | 0.054 | 0.257 | 0.45 | 2.8 | 0.0124 |
| 1J | 236 | 0.182 | 0.117 | 0.115 | 0.19 | 3.7 | 0.0067 |
| Reference Example | | | | | | | |
| 1A | 443 | 0.236 | 0.081 | 0.218 | 0.43 | 9.6 | 0.0409 |
| 1B | 478 | 0.219 | 0.045 | 0.210 | 0.46 | 9.6 | 0.0437 |
| 1C | 204 | 0.143 | 0.076 | 0.082 | 0.32 | 11.5 | 0.0364 |
| 1D | 280 | 0.236 | 0.147 | 0.094 | 0.45 | 13.9 | 0.0619 |

From TABLE 3, in Example 1A to Example 1E, the bulk density of the solidified porous carbon material was in the range of 0.2 to 0.4 grams/$cm^3$, preferably, in the range of 0.3 to 0.4 grams/$cm^3$. The value (the value of "mercury press-in method-B") of the cumulative pore volume in the range of 0.05 to 5 μm in pore size based on the mercury press-in method was in the range of 0.4 to 1.2 $cm^3$, preferably, 0.5 to 1.0 $cm^3$ per 1 gram of the solidified porous carbon material. In addition, the value (the value of "mercury press-in method-A") of the cumulative pore volume in the range of 10 μm or less in pore size based on the mercury press-in method was in the range of 0.7 to 2.0 $cm^3$, preferably, 0.7 to 1.7 cm³ per 1 gram of the solidified porous carbon material. Moreover, the value of the pore volume based on the BJH method was 0.1 cm³ or more per 1 cm³ of the solidified porous carbon material. The value of the pore volume based on the MP method was in the range of 0.04 to 0.1 cm³ per 1 cm³ of the solidified porous carbon material. Furthermore, the value of the pore volume based on the BJH method was 0.3 cm³ or more per 1 gram of the solidified porous carbon material, and the value of the pore volume based on the MP method was 0.1 cm³ or more per 1 gram of the solidified porous carbon material. In addition, the bulk density of the ignition residue of the solidified porous carbon material was in the range of $1\times10^{-4}$ to $1\times10^{-1}$ grams/cm³, preferably, $1\times10^{-2}$ to $1\times10^{-1}$ grams/cm³.

Figure 1B:
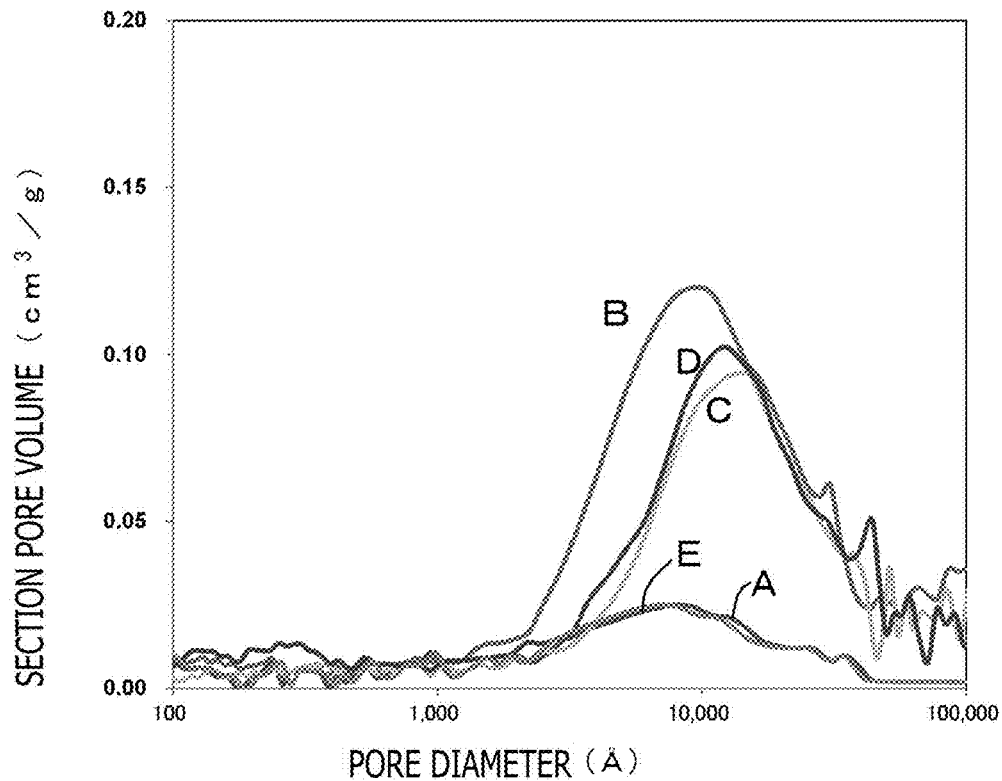
Figure 2A:
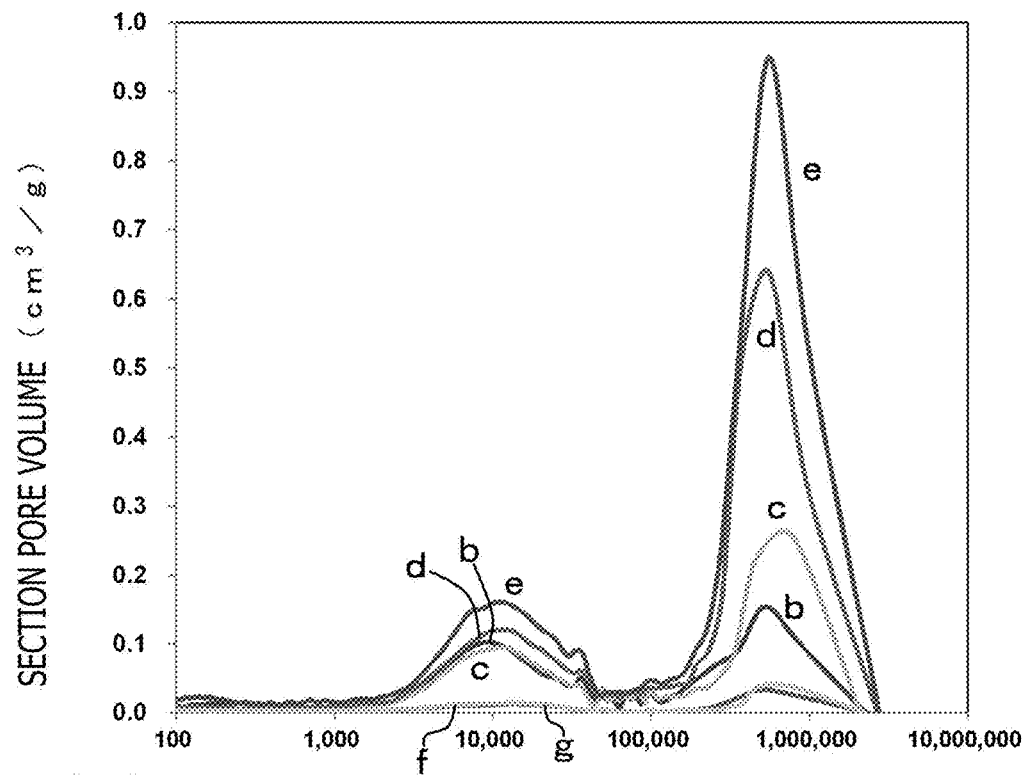
FIG. 2A and FIG. 2B are graphs depicting measurement results of various kinds of materials of Comparative Example 1 based on the mercury press-in method.
Figure 2B:
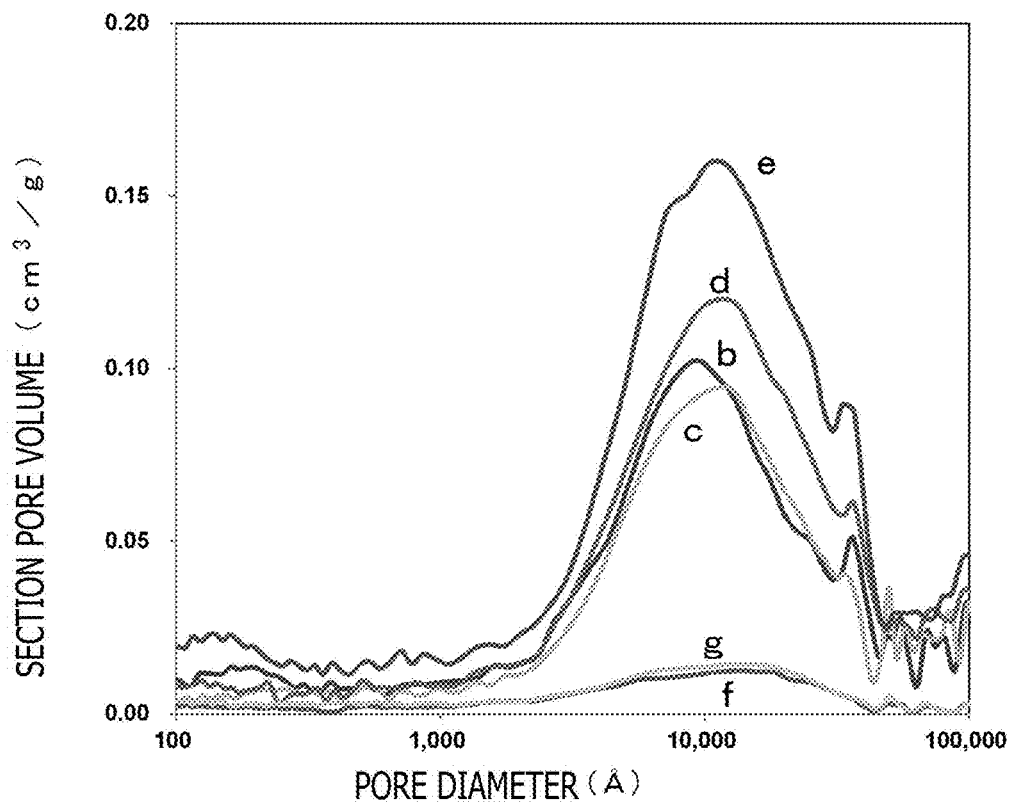
Figure 3A:
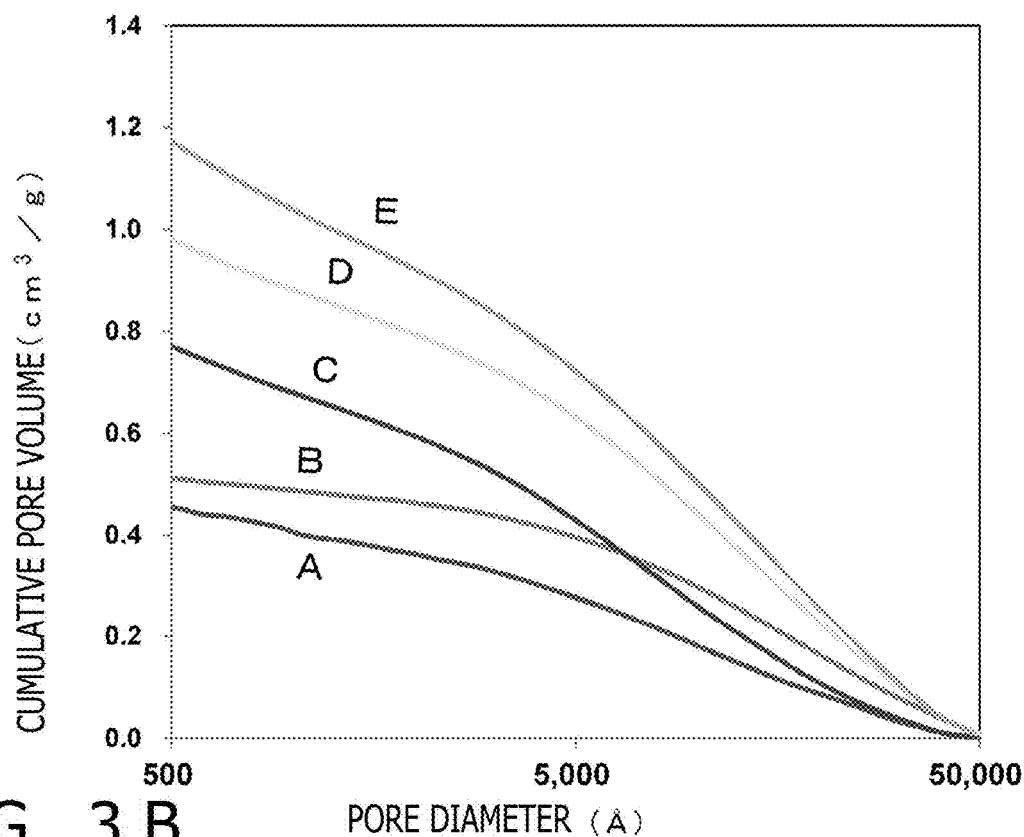
FIG. 3A and FIG. 3B are graphs depicting values of cumulative pore volumes in the range of 0.05 to 5 μm in a solidified porous carbon material of Example 1, and various kinds of materials of Comparative Example 1 based on the mercury press-in method.
Figure 3B:
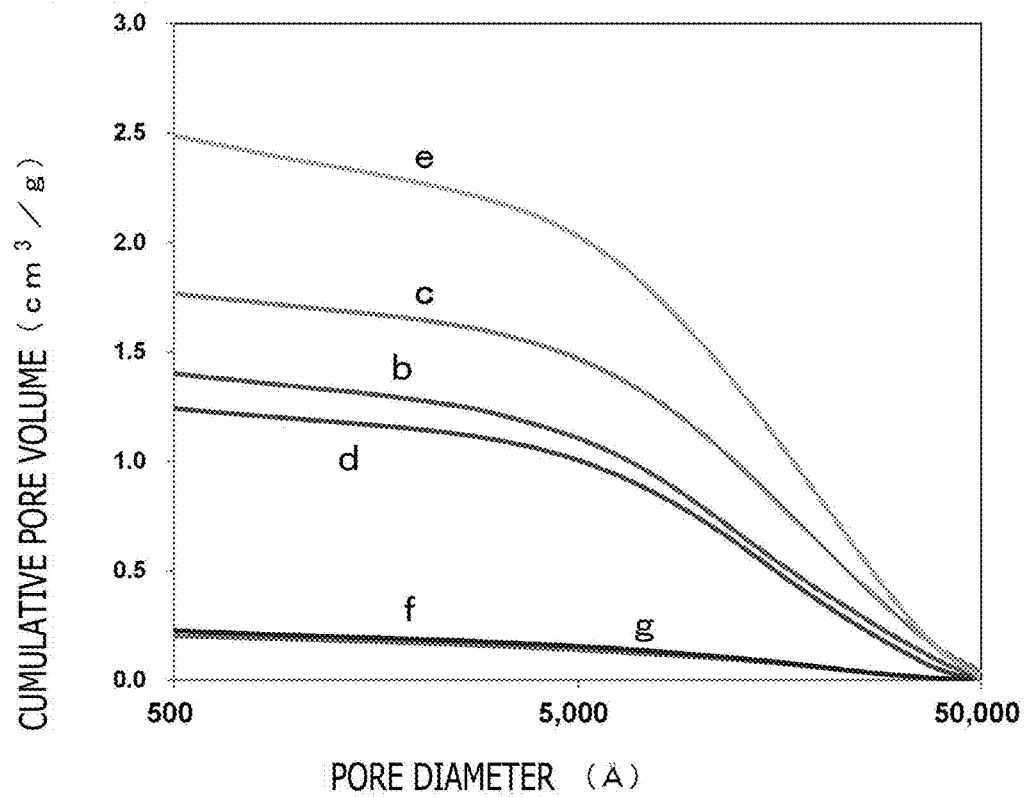

The measurement results based on the mercury press-in method are depicted in the form of graphs of FIG. 1A, FIG. 1B, FIG. 2A and FIG. 2B. It should be noted that the graph of FIG. 1B is obtained by enlarging a portion of peaks on the left side in the graphs of FIG. 1A, and the graph of FIG. 2B is obtained by enlarging a portion of peaks on the left side in the graphs of FIG. 2A. An axis of abscissa of each of FIGS. 1A, 1B, 2A and 2B represents a pore diameter (unit: angstrom), and an axis of ordinate represents a sector pore volume (unit: cm³/gram). Peaks on the right side in the graphs of FIG. 1A and FIG. 2A is due to the gaps which are present between the solidified porous carbon materials. In addition, each of FIGS. 3A and 3B depicts the graph representing the value of the cumulative pore volume, in the range of 0.05 to 5 μm, which was obtained on the basis of the mercury press-in method. In FIG. 1A, FIG. 1B and FIG. 3A, "A" depicts the volume of Example 1A, "B" depicts the volume of Example 1B, "C" depicts the volume of Example 1C, "D" depicts the volume of Example 1D, and "E" depicts the volume of Example 1E. In FIG. 2A, FIG. 23, and FIG. 3B, "b" depicts the value of Comparative Example 1B, "c" depicts the value of Comparative Example 1C, "d" depicts the value of Comparative Example 1D, "e" depicts the value of Comparative Example 1E, "i" depicts the value of Comparative Example 1F, and "g" depicts the value of Comparative Example 1G. In FIG. 3B, the values (f) of Comparative Example 1F and the values (g) of Comparative Example 1G overlap each other.

As compared with the porous carbon material which is not solidified (Comparative Example 1B to Comparative Example 1E), and the activated carbon using the coconut shell as the raw material (Comparative Example 1F to Comparative Example 1J), since the porous carbon materials of Example 1A to Example 1E are solidified, the transport and the handling of the porous carbon material can be more readily carried out. In addition, in the method of manufacturing the porous carbon material of Example 1, the plant-derived material is solidified, next is carbonized in the solidified state at 400° C. to 1400° C., and next is treated with the acid or alkali. Therefore, the transport and the handling of the raw material or the porous carbon material, the treatment of the carbonization, and the treatment with the acid or alkali can be more readily carried out. Moreover, the solidified porous carbon materials of Example 1A to Example 1E have the physical property values described above. Therefore, the value of the surface area per unit volumes, the value of the micro pore (the value of the pore volume based on the MP method), and the value of the meso pore (the value of the pore volume based on the BJH method) are large and thus the number of reaction surfaces or adsorption pores per unit volume is increased as compared with the case of the porous carbon materials which are not solidified (Comparative Example 1B to Comparative Example 1E). Therefore, the solidified porous carbon material indicates the excellent benefit in that the solidified porous carbon material causes more substances to be reacted/adsorbed within the limited space such as the filter of the air cleaner or the water filter. In addition, as compared with the case of the activated carbon using the coconut shell as the raw material (Comparative Example 1F to Comparative Example 1H), since the rate of the meso pore or the macro pore is large, the diffusion of the water, the air, and the solvent becomes easy to cause within the porous carbon material and thus the reaction speed is increased. As a result, the solidified porous carbon material indicates the excellent benefit in the use application, of the filter of the air cleaner, the filter of the water filter, the water filter cartridge or the like in which more reactions are required for a short period of time. Incidentally, since the wood activated carbon (Comparative Example 1J) is manufactured from the sawdust which is previously crashed, the product thereof is the powder. In the case where the powder product is used in the filter of the water filter or the air cleaner, the pressure loss becomes high, and the powder product is the material which is unsuitable for the filter of the water filter or the air cleaner.

EXAMPLE 2

In Example 2, a description will be given with respect to an example in which the solidified porous carbon material described in each of Examples 1A to 1E is used as a filter medium in the water filter.

Figure 4:
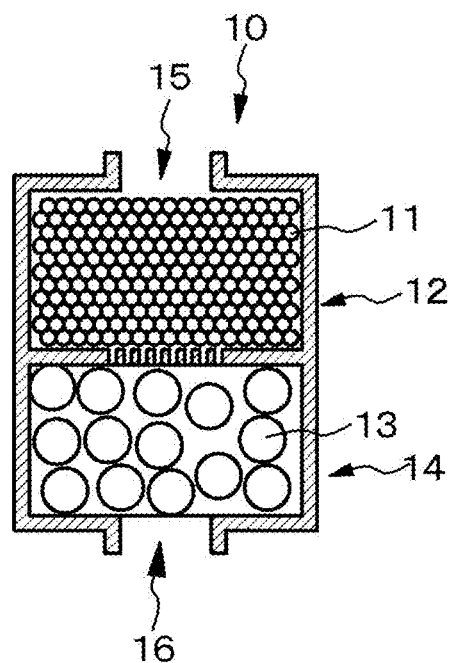
FIG. 4 is a schematic cross-sectional view of a water filter of Example 2.

FIG. 4 depicts a cross-sectional view of a water filter of Example 2. The water filter of Example 2 is a continuous water filter, and is also a faucet direct attachment type water filter a water filter main body of which is directly attached to a top portion of a faucet. The water filter of Example 2 is provided with a water filter main body 10, a first filling portion 12, and a second filling portion 14. In this case, the first filling portion 12 is arranged inside the water filter main body 10, and is filled with the solidified porous carbon material 11 of each of Examples 1A to 1E. The second filling portion 14 is filled with cotton 13. The tap water discharged from the faucet passes the porous carbon material 11 and the cotton 13 from an inlet 15 provided in the water filter main body 10 and is discharged through an outlet 16 provided in the water filter main body 10.

Figure 5A:
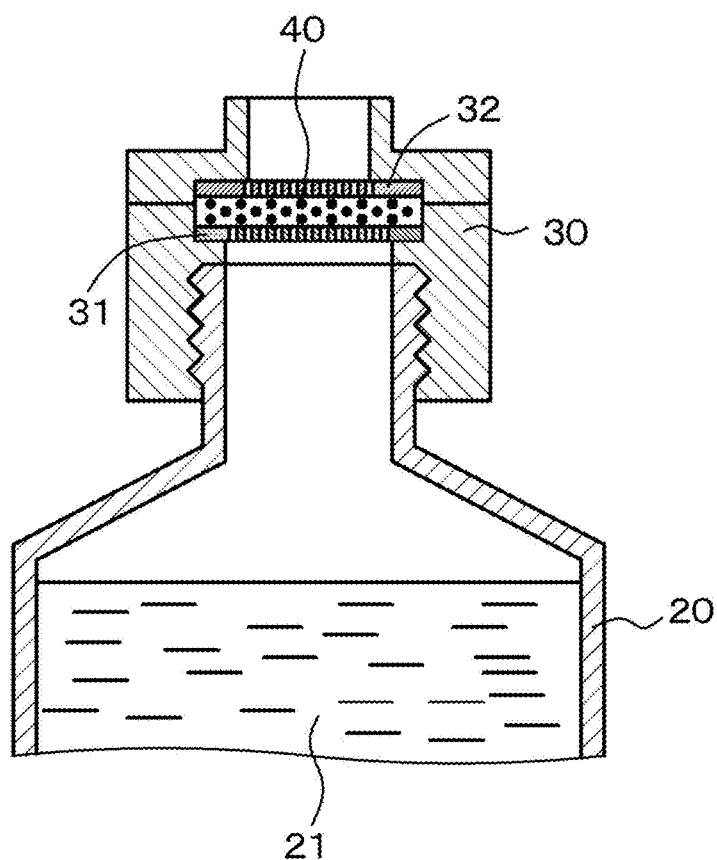
FIG. 5A and FIG. 5B are respectively a schematic partial cross-sectional view and a schematic cross-sectional view of a bottle in Example 2.

Alternatively, as depicted in FIG. 5A of a schematically partial cross-sectional view, a filter medium 40 including the solidified porous carbon material described in each of Examples 1A to 1E (hereinafter, simply referred to as "a filter medium 40") can also be incorporated in a bottle (so-called a plastic bottle) 20 with a cap member 30. Specifically, the filter medium 40 was disposed inside the cap member 30, and filters 31 and 32 were arranged on a liquid inflow side and a liquid discharge side of the cap member 30, respectively, so as not to flow out the filter medium 40. Then, the liquid or the water (such as the drinking water or the skin lotion) 21 within the bottle 20 is caused to pass through the filter medium 40 disposed inside the cap member 30 to be drunk, or used, thereby enabling, for example, the mineral components in the liquid (water) to be increased. It should be noted that the cap member 30 is normally closed by using a cover (not depicted).

Figure 5B:
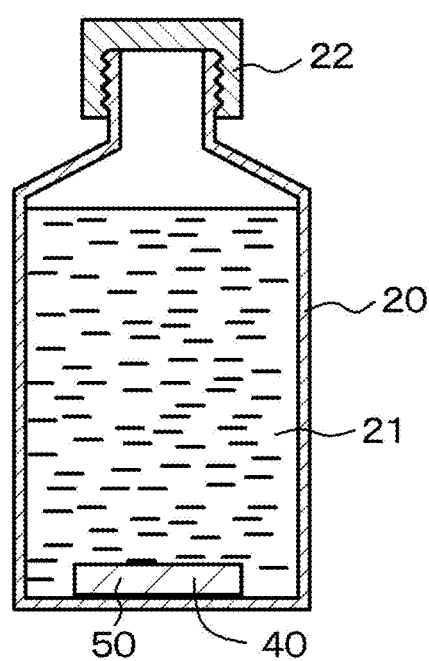
Figure 6A:
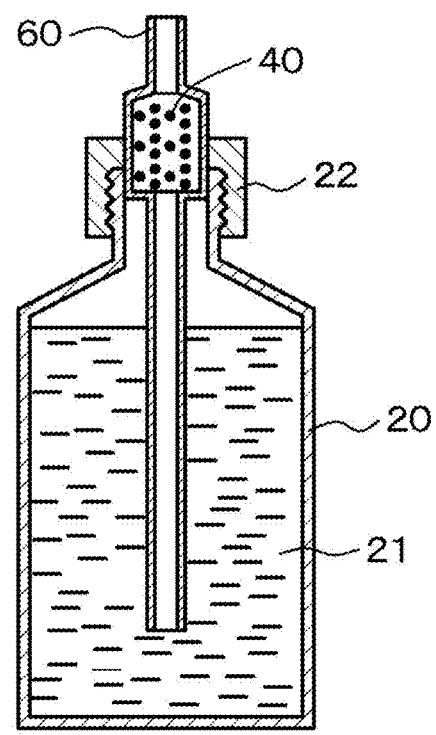
FIG. 6A and FIG. 6B are respectively a schematic partial cross-sectional view and a partially cutaway schematic view of a modified change of the bottle of Example 2.
Figure 6B:
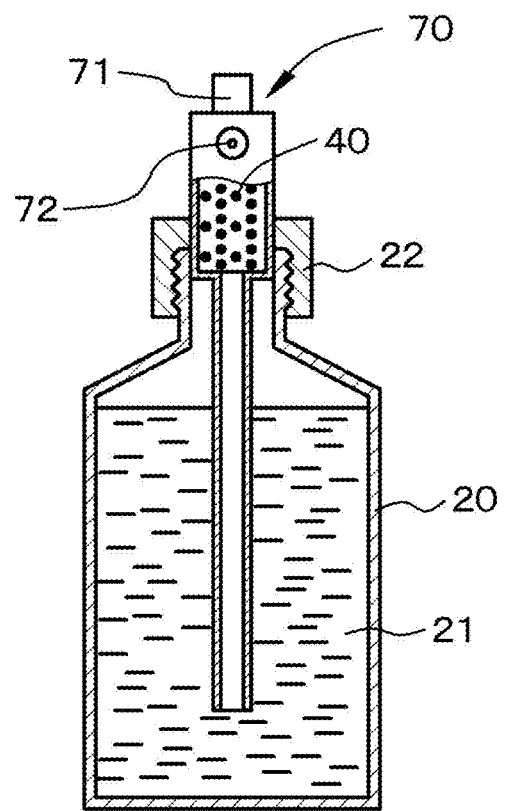

Alternatively, as depicted in FIG. 5B of a schematically cross-sectional view, it is also possible to adopt a form in which the filter medium 40 is stored in a bag 50 having the permeability, and this bag 50 is put into the liquid or water (such as the drinking water or the skin lotion) 21 within the bottle 20. It should be noted that reference numeral 22 designates a cap for closing an oral portion of the bottle 20. Alternatively, as depicted in FIG. 6A of a schematically cross-sectional view, the filter medium 40 is disposed inside a straw member 60, and the filters (not depicted) are each arranged on the liquid film inflow side and the liquid discharge side of the straw member 60 so as not to flow out the filter medium 40. Then, the liquid or the water (drinking water) 21 within the bottle 20 is caused to pass through the filter medium 40 disposed inside the straw member 60 to be drunk, thereby enabling the mineral components in the liquid (water) to be increased. Alternatively, as depicted in FIG. 6B of a partially cutaway view, the filter medium 40 is disposed inside a spray member 70, and filters (not depicted) are each arranged on the liquid inflow side and the liquid discharge side of the spray member 70, so as not to flow out the filter medium 40. Then, by pressing down a push button 71 provided in the spray member 70, the liquid or water (such as the drinking water or the skin lotion) 21 within the bottle 20 is caused to pass through the filter medium 40 disposed inside the spray member 70 to be sprayed through a spray hole 72, thereby enabling the mineral components within the liquid (water) to be increased.

Although the present disclosure has been described so far on the basis of preferred Examples, the present disclosure is by no means limited to these Examples and various changes can be made. The solidified porous carbon material, the raw material (plant-derived material), the manufacturing method, the manufacturing condition, and the like which have been described in Examples are merely exemplifications, and can be suitably changed. A water filter in which the filter medium including the solidified porous carbon material described in Example 1, and a ceramic filter medium (a ceramic filter medium having fine holes) are combined with each other, and a water filter in which the filter medium and the ion-exchange resin are combined with each other can also be obtained as the filter medium described in Example 2.

It should be noted that the present disclosure can adopt the following constitutions.

[A01]<<Solidified Porous Carbon Material>>

A solidified porous carbon material using a plant-derived material as a raw material, in which a bulk density of the solidified porous carbon material is in a range of 0.2 to 0.4 grams/cm$^3$, and a value of a cumulative pore volume in a range of 0.05 to 5 μm in pore size based on a mercury press-in method is in a range of 0.4 to 1.2 cm$^3$ per 1 gram of the solidified porous carbon material.

[A02]

The solidified porous carbon material according to [A01], in which the value of the cumulative pore volume in the range of 0.05 to 5 μm in pore size based on the mercury press-in method is in a range of 0.5 to 1.0 cm$^3$ per 1 gram of the solidified porous carbon material.

[A03]

The solidified porous carbon material according to [A01] or [A02], in which the value of the cumulative pore volume in a range of 10 μm or less in pore size based on the mercury press-in method is in a range of 0.7 to 2.0 cm$^3$ per 1 gram of the solidified porous carbon material.

[A04]

The solidified porous carbon material according to any one of [A01] to [A03], in which a value of a pore volume based on a BJH method is 0.1 cm$^3$ or more per 1 cm$^3$ of the solidified porous carbon material.

[A05]

The solidified porous carbon material according to any one of [A01] to [A04], in which a value of a pore volume based on an MP method is in a range of 0.04 to 0.1 cm$^3$ per 1 cm$^3$ of the solidified porous carbon material.

[A06]

The solidified porous carbon material according to any one of [A01] to [A05], in which a value of a pore volume based on a BJH method is 0.3 cm$^3$ or more per 1 gram of the solidified porous carbon material, and a value of a pore volume based on an MP method is 0.1 cm$^3$ or more per 1 gram of the solidified porous carbon material.

[A07]

The solidified porous carbon material according to any one of [A01] to [A06], in which a value of an ignition residue of the solidified porous carbon material is equal to or larger than 0.1 mass %, and equal to or smaller than 20 mass %.

[A08]

The solidified porous carbon material according to any one of [A01] to [A07], in which a bulk density of an ignition residue of the solidified porous carbon material is in a range of $1\times10^{-4}$ to $1\times10^{-1}$ grams/cm$^3$.

[A09]

The solidified porous carbon material according to any one of [A01] to [A08], in which destruction hardness is 20 N or more.

[B01]<<Method of Manufacturing Porous Carbon Material>>

A method of manufacturing a solidified porous carbon material, including:

solidifying a plant-derived material;

next carbonizing the material at 400° C. to 1400° C. in the solidified state; and next treating the material with an acid or an alkali.

[B02]

The method of manufacturing a solidified porous carbon material according to [B01], in which a bulk density of the solidified porous carbon material is in a range of 0.2 to 0.4 grams/cm$^3$, and a value of a cumulative pore volume in a range of 0.05 to 5 μm in pore size based on a mercury press-in method is in a range of 0.4 to 1.2 cm$^3$ per 1 gram of the solidified porous carbon material.

[B03]

The method of manufacturing a solidified porous carbon material according to [B01] or [B02], in which a bulk density of the solidified plant-derived material is in a range of 0.2 to 1.4 grams/cm$^3$.

[B04]

The method of manufacturing a solidified porous carbon material according to any one of [B01] to [B03], in which a bulk density of a material carbonized in a solidified state is in a range of 0.2 to 0.3 grams/cm$^3$.

[B05]

The method of manufacturing a solidified porous carbon material according to any one of [B01] to [B04], in which when the plant-derived material is solidified, starch or dogtooth violet starch is used as a binder.

[B06]

The method of manufacturing a solidified porous carbon material according to any one of [B01] to [B05], in which a value of an ignition residue of the porous carbon material solidified through an acid or alkali treatment is set equal to or larger than 0.1 mass %, and equal to or smaller than 20 mass %.

[B07]

The method of manufacturing a solidified porous carbon material according to any one of [B01] to [B06], in which a bulk density of an ignition residue of a material carbonized in a solidified state is equal to or larger than 0.1 grams/cm$^3$, and a bulk density of the ignition residue of the solidified porous carbon material is in a range of $1 \times 10^{-4}$ to $1 \times 10^{-1}$ grams/cm$^3$.

[B08]

The method of manufacturing a solidified porous carbon material according to any one of [B01] to [B07], in which the value of the cumulative pore volume in the range of 0.05 to 5 μm in pore size based on the mercury press-in method is in a range of 0.5 to 1.0 cm$^3$ per 1 gram of the solidified porous carbon material.

The method of manufacturing a solidified porous carbon material according to any one of [B01] to [B08], in which the value of the cumulative pore volume in a range of 10 μm or less in pore size based on the mercury press-in method is in a range of 0.7 to 2.0 cm$^3$ per 1 gram of the solidified porous carbon material.

[B10]

The method of manufacturing a solidified porous carbon material according to any one of [B01] to [B09], in which a value of a pore volume based on a BJH method is 0.1 cm$^3$ or more per 1 cm$^3$ of the solidified porous carbon material.

[B11]

The method of manufacturing a solidified porous carbon material according to any one of [B01] to [B10], in which a value of a pore volume based on an MP method is in a range of 0.04 to 0.1 cm$^3$ per 1 cm$^3$ of the solidified porous carbon material.

The method of manufacturing a solidified porous carbon material according to any one of [B01] to [B11], in which a value of a pore volume based on a BJH method is 0.3 cm$^3$ or more per 1 gram of the solidified porous carbon material, and a value of a pore volume based on an MP method is 0.1 cm$^3$ or more per 1 gram of the solidified porous carbon material.

[B13]

The method of manufacturing a solidified porous carbon material according to any one of [B01] to [B12], in which a value of an ignition residue of the solidified porous carbon material is equal to or larger than 0.1 mass %, and equal to or smaller than 20 mass %.

[B14]

The method of manufacturing a solidified porous carbon material according to any one of [B01] to [B13], in which a bulk density of an ignition residue of the solidified porous carbon material is in a range of $1 \times 10^{-4}$ to $1 \times 10^{-1}$ grams/cm$^3$.

[B15]

The method of manufacturing a solidified porous carbon material according to any one of [B01] to [B14], in which destruction hardness of the solidified porous carbon material is 20 N or more.

[C01] <<Water Filter>>

A water filter, including:

a water filter main body; and a filling portion arranged inside the water filter main body and filled with the porous carbon material 11 according to any one of [A01] to [A09].

REFERENCE SIGNS LIST

10 . . . Water filter main body, 11 . . . Porous carbon material, 12 . . . First filling portion, 13 . . . Cotton, 14 . . . Second filling portion, 15 . . . Inlet, 16 . . . Outlet, 20 . . . Bottle, 21 . . . Liquid or water, 22 . . . Cap, 30 . . . Cap member, 31, 32 . . . Filter, 40 . . . Filter medium, 50 . . . Bag, 60 . . . Straw member, 70 . . . Spray member, 71 . . . Push button, 72 . . . Spray hole It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A solidified porous carbon material comprising a plant-derived material in a solidified form, wherein the solidified porous carbon material includes a pore volume based on a MP method ranging from 0.040 cm$^3$ to 0.1 cm$^3$ per 1 cm$^3$ of the solidified porous carbon material, wherein a cumulative pore volume is in a range of 0.4 to 1.2 cm$^3$ per 1 gram of the solidified porous carbon material based on a mercury press-in method for pore size of 0.05 to 5 μm, and wherein the solidified form of the plant-derived material is a cylindrical shape, a firewood bar shape, a coil shape or a granular shape.

2. The solidified porous carbon material according to claim 1, wherein the cumulative pore volume in the range of 0.05 to 5 μm in pore size based on the mercury press-in method is in a range of 0.48 to 1.0 cm$^3$ per 1 gram of the solidified porous carbon material.

3. The solidified porous carbon material according to claim 1, wherein a cumulative pore volume in a range of 10 μm or less in pore size based on a mercury press-in method is in a range of 0.7 to 2.0 cm$^3$ per 1 gram of the solidified porous carbon material.

4. The solidified porous carbon material according to claim 1, wherein a value of an ignition residue of the solidified porous carbon material is equal to or larger than 0.1 mass %, and equal to or smaller than 20 mass %.

5. The solidified porous carbon material according to claim 1, wherein a bulk density of an ignition residue of the solidified porous carbon material is in a range of $1 \times 10^{-4}$ to $1 \times 10^{-1}$ grams/cm$^3$.

6. The solidified porous carbon material according to claim 1, wherein destruction hardness is 20 N or more.

7. The solidified porous carbon material according to claim 1, wherein a bulk density of the solidified porous carbon material is in a range of 0.2 to 0.4 grams/cm$^3$.

8. The solidified porous carbon material according to claim 1, wherein the cylindrical shape has a diameter ranging from 2 mm to 15 mm and a length ranging from 10 mm to 60 mm.

9. The solidified porous carbon material according to claim 1, wherein the solidified porous carbon material includes a specific surface area that ranges from 180 m$^2$/cm$^3$ to 300 m$^2$/cm$^3$.

10. The solidified porous carbon material according to claim 1, wherein the solidified porous carbon material includes a value of a pore volume based on a BJH method ranging from 0.10 cm$^3$ to 0.19 cm$^3$ per 1 cm$^3$ of the solidified porous carbon material.

11. The solidified porous carbon material according to claim 1, wherein the solidified form of the plant-derived material does not include a binder.

* * * * *